United States Patent
Khrapko

(10) Patent No.: US 11,370,689 B2
(45) Date of Patent: Jun. 28, 2022

(54) VACUUM-BASED METHODS OF FORMING A CANE-BASED OPTICAL FIBER PREFORM AND METHODS OF FORMING AN OPTICAL FIBER USING SAME

(71) Applicant: CORNING INCORPORATED, Corning, NY (US)

(72) Inventor: Rostislav Radiyevich Khrapko, Corning, NY (US)

(73) Assignee: Corning Incorporated, Corning, NY (US)

( * ) Notice: Subject to any disclaimer, the term of this patent is extended or adjusted under 35 U.S.C. 154(b) by 183 days.

(21) Appl. No.: 16/791,708

(22) Filed: Feb. 14, 2020

(65) Prior Publication Data

US 2020/0277219 A1 Sep. 3, 2020

Related U.S. Application Data

(60) Provisional application No. 62/811,842, filed on Feb. 28, 2019.

(51) Int. Cl.
*C03B 37/012* (2006.01)
*C03B 37/027* (2006.01)

(52) U.S. Cl.
CPC .. *C03B 37/01222* (2013.01); *C03B 37/01231* (2013.01); *C03B 37/01248* (2013.01);
(Continued)

(58) Field of Classification Search
CPC ....... C03B 37/01222; C03B 37/01211–01222; C03B 37/01231; C03B 37/01248
See application file for complete search history.

(56) References Cited

U.S. PATENT DOCUMENTS 5,461,871 A 10/1995 Bracque et al.
5,735,927 A 4/1998 Sanghera et al.
(Continued)

FOREIGN PATENT DOCUMENTS

EP 0147225 A2 7/1985
JP 62012625 A 1/1987
(Continued)

OTHER PUBLICATIONS

International Search Report and Written Opinion of the International Searching Authority; PCT/US2020/017056; dated May 7, 2020; 12 Pages; European Patent Office.

*Primary Examiner* — Lisa L Herring
(74) *Attorney, Agent, or Firm* — Kevin L. Bray

(57) ABSTRACT

The vacuum-based methods of forming an optical fiber preform include applying a vacuum to a preform assembly. The preform assembly has at least one glass cladding section with one or more axial through holes, with one or more canes respectively residing in the one or more axial through holes. The opposite ends of the at least one glass cladding section are capped to define a substantially sealed internal chamber. A vacuum is applied to the substantially sealed internal chamber to define a vacuum-held preform assembly. The methods also include heating the vacuum-held preform assembly to just above the glass softening point to consolidate the vacuum-held preform to form the cane-based glass preform. An optical fiber is formed by drawing the cane-based glass preform. The same furnace used to consolidate the vacuum-held preform can be used to draw the optical fiber.

20 Claims, 20 Drawing Sheets

(52) U.S. Cl.
CPC ........ *C03B 37/027* (2013.01); *C03B 2203/23* (2013.01); *C03B 2203/34* (2013.01)

(56) References Cited

U.S. PATENT DOCUMENTS

| | | | |
|---|---|---|---|
| 5,944,667 | A | 8/1999 | Leveque et al. |
| 6,418,258 | B1 | 7/2002 | Wang |
| 2003/0079503 | A1 | 5/2003 | Cook et al. |
| 2003/0164006 | A1 | 9/2003 | Buchanan et al. |
| 2004/0240817 | A1* | 12/2004 | Hawtof ............. G02B 6/02038 385/125 |
| 2008/0107385 | A1* | 5/2008 | Ohga ................ C03B 37/01211 385/123 |
| 2013/0291604 | A1* | 11/2013 | Frigerio ............ C03B 37/01248 65/412 |
| 2014/0174134 | A1* | 6/2014 | Fattal ................ C03B 37/01245 65/412 |
| 2015/0274577 | A1 | 10/2015 | Nakanishi et al. |
| 2016/0347645 | A1 | 12/2016 | Gonda et al. |
| 2018/0072608 | A1* | 3/2018 | Rudl .................. C03B 37/0126 |
| 2018/0244558 | A1* | 8/2018 | Kishinevski ........ C03B 37/0753 |

FOREIGN PATENT DOCUMENTS

| | | |
|---|---|---|
| JP | 11139841 A | 5/1999 |
| WO | 98/00371 A1 | 1/1998 |

\* cited by examiner

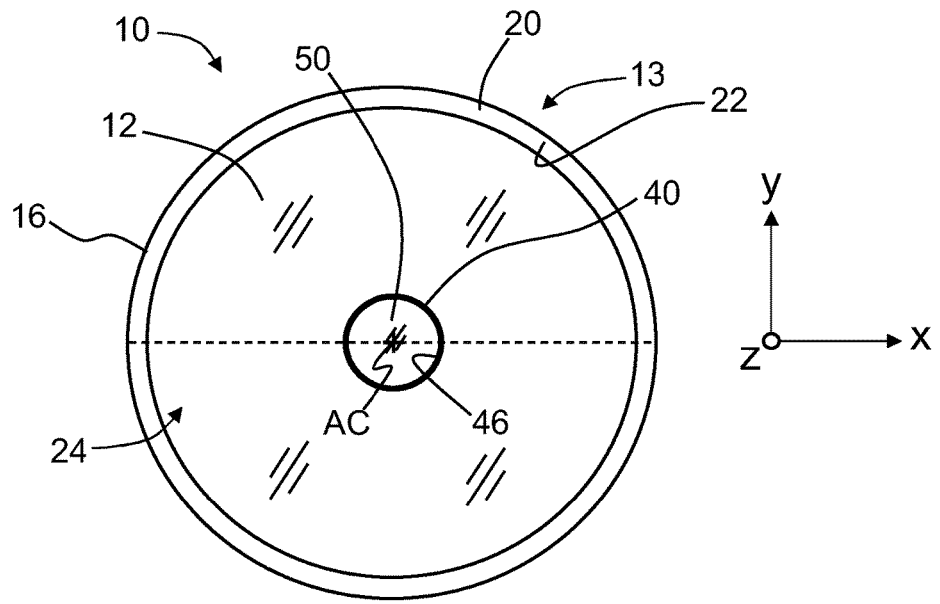
FIG. 3A
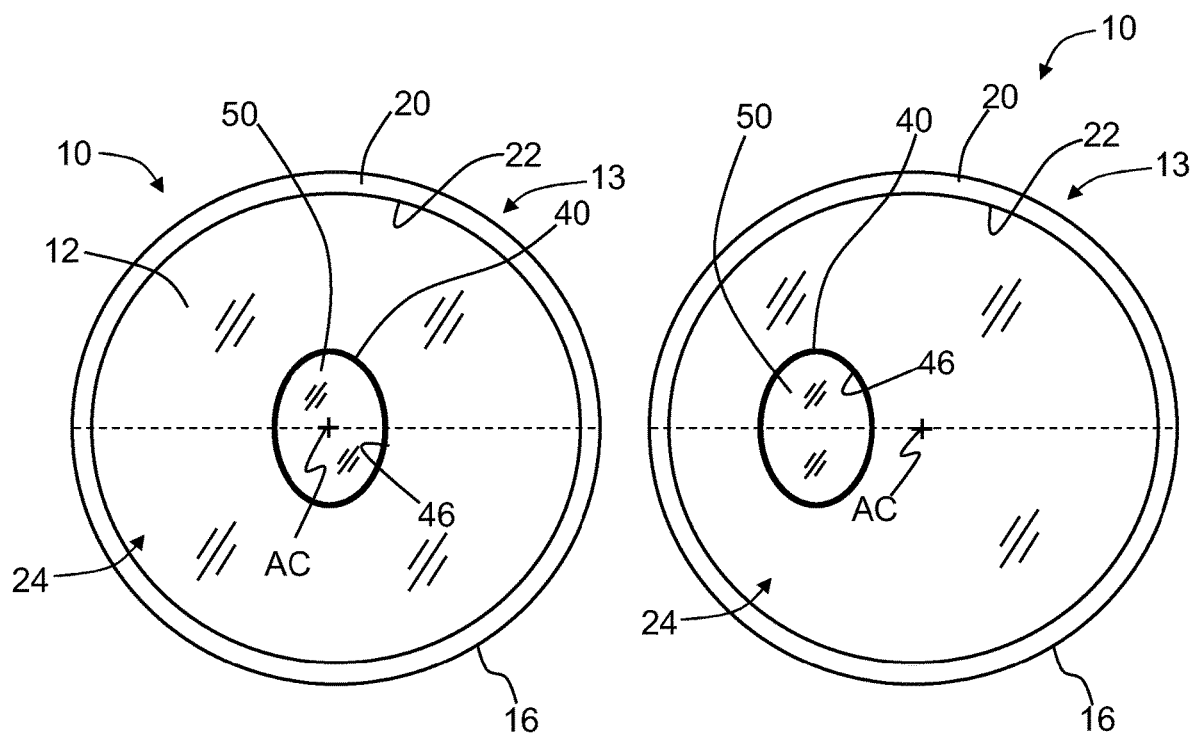
FIG. 3B     FIG. 3C

VACUUM-BASED METHODS OF FORMING A CANE-BASED OPTICAL FIBER PREFORM AND METHODS OF FORMING AN OPTICAL FIBER USING SAME

This application claims the benefit of priority to U.S. Provisional Application Ser. No. 62/811,842 filed on Feb. 28, 2019, the content of which is relied upon and incorporated herein by reference in its entirety.

FIELD

The present disclosure relates to optical fibers, and in particular to vacuum-based methods of forming a cane-based optical fiber preform, and methods of forming an optical fiber using the cane-based optical fiber preform.

BACKGROUND

Multicore fiber technology for spatial multiplexing is being considered both for long haul communications and for short distance optical fiber interconnects used within data centers and high-performance computers. Connecting multicore fibers requires very precise positioning of the individual cores, with typical tolerances being a fraction of a micrometer. This key requirement dictates the choice of materials and processes when forming the optical fiber preform.

Single-core and multi-core fibers can be fabricated from a glass preform made using what is referred to in the art as an all-glass process. The all-glass process utilizes a bulk cladding glass with one or more precision-formed axial holes sized to accommodate respective one or more canes that define the core(s) of the preform and thus the optical fiber formed from the glass preform.

An all-glass process may be preferred over deposition-based processes (e.g., an outside vapor deposition (OVD) process) involving soot layering, soot pressing and soot drilling, sintering, and consolidation to convert the soot to glass. The ability to precision grind the outer surface of the cladding glass to a select diameter and to perform precision drilling of the cladding glass provides both the precision and flexibility of choosing a variety of spacings, shapes, and arrangements of the one or more axial holes when forming the glass preform.

Unfortunately, the all-glass process is relatively expensive and time consuming. The precision hole drilling takes time, the one or more canes need to be formed to define a select refractive index profile and then added to the cladding glass, and the entire structure needs to be consolidated in a furnace to form the solid glass preform. To make the glass preform of sufficient length, it may be necessary to axially combine separate glass cladding sections, which involves precise alignment of the axial holes. The consolidation process typically requires a special support fixture to hold the glass claddings sections and canes in a consolidation furnace and then removing the resulting solid glass preform from the furnace, unloading it from the support fixture and then operably supporting it at the draw furnace of the draw system to make the optical fiber.

SUMMARY

Aspects of the methods disclosed herein are directed to forming a cane-based glass preform and using the cane-based glass preform to draw an optical fiber. The methods can be used to form either a single core cane-based glass preform or a multicore cane-based glass preform. The method utilizes one or more glass cladding sections each having one or more precision axial holes formed therein and a top end with a recess defined by a perimeter lip. When using multiple glass cladding sections, the sections are stacked so that the axial holes are aligned. A cane or canes are then added to the one or more axial holes to define a cane-cladding assembly.

Top and bottom caps are respectively added to the top and bottom of the cane-cladding assembly to define a preform assembly. The top cap closes off the recess at the top of the glass-cladding section. The bottom cap can have its own raised lip and recess that becomes closed off when the bottom cap is interfaced with the bottom end of the cane-cladding assembly. The closed-off recesses and gaps formed by the canes within the axial holes defined a substantially sealed internal chamber. The preform assembly can be dried and purified by drawing a select cleaning gas (e.g., chlorine) through a small passage in the bottom cap that leads to the internal chamber. A vacuum is applied through the top cap to create a pressure differential between the internal chamber and the ambient environment. The pressure differential keeps the components of the preform assembly together. This is referred herein to as a vacuum-held preform assembly. The vacuum-held preform assembly constitutes a preform assembly product formed using the methods disclosed herein.

The vacuum-held preform assembly is consolidated by heating in a furnace to just above the glass softening temperature so that the glass cladding section(s), the canes and the top and bottom caps, which are all made of glass, seal to one another. In addition, the glass flow removes the internal chamber. The result is a solid glass preform that is ready to be drawn, especially if the furnace used for the consolidation is a draw furnace used for drawing optical fiber. The cane-based preform constitutes a preform product formed using the methods disclosed herein.

An embodiment of the disclosure is a method of forming a cane-based preform, comprising: applying a vacuum to a preform assembly, the preform assembly comprising at least one glass cladding section having one or more axial holes and a top end and a bottom end, with one or more canes respectively residing in the one or more axial holes; capping the top and bottom ends to define a substantially sealed internal chamber; and heating the vacuum-held preform assembly to just above the glass softening point to consolidate the vacuum-held preform to form the cane-based glass preform.

Another embodiment of the disclosure is a method of forming a cane-based glass preform, comprising: forming one or more axial holes in each of multiple glass cladding sections each having a body, a top end, a bottom end and a perimeter, with each top end having a lip that runs around the perimeter and that defines a top recess, and wherein each axial hole is defined by a cylindrical inner surface of the body; stacking the multiple glass cladding sections so that the axial holes formed in each glass cladding section are axially aligned, with the stacked multiple glass cladding sections having an overall stack length LS, an uppermost glass cladding section and a lowermost glass cladding section; inserting one or more glass canes into the respective one or more aligned axial holes of the multiple glass cladding sections such that there is a gap between each glass cane and the cylindrical inner surface of the axial hole in which it resides; interfacing a glass top cap with the top end of the uppermost glass cladding section and interfacing a glass bottom cap with the bottom end of the lowermost glass cladding section to define a preform assembly having a substantially sealed internal chamber that includes the top recess and the gaps; applying a vacuum through the glass top cap to the substantially sealed internal chamber to create with respect to an ambient environment a pressure differential that holds together the preform assembly to define a vacuum-held preform assembly; and heating the vacuum-held preform assembly to just above the glass softening point to consolidate the vacuum-held preform assembly to form the glass preform.

Another embodiment of the disclosure is a method of forming a cane-based glass preform assembly, comprising: forming one or more axial holes in at least one glass cladding section, the at least one cladding section having a top end and a bottom end; adding one or more canes to the respective one or more axial holes so that each axial hole includes a cane; capping the top and bottom ends to form a preform assembly having a substantially sealed internal chamber that pneumatically connects the top and bottom ends through the axial holes; and applying a vacuum to the substantially sealed internal chamber to create a pressure differential between the substantially sealed internal chamber and an ambient environment to form a vacuum-held preform assembly.

Another embodiment of the disclosure is a method of forming a cane-based glass preform assembly for forming a multicore optical fiber, comprising: stacking multiple glass cladding sections each having multiple axial holes so that the axial holes are aligned, with adjacent glass cladding sections being interfaced with a raised lip that forms an internal cavity, and wherein there is an uppermost and a lowermost glass cladding section; adding a cane to each of the aligned axial holes to define gaps within the axial holes that provide pneumatic communication between the internal cavities; capping the uppermost and lowermost glass cladding sections to define a preform assembly having a substantially sealed internal chamber that comprises the internal cavities and the gaps; and applying a vacuum to the substantially sealed internal chamber to form a vacuum-held preform assembly.

Another embodiment of the disclosure is a cane-based preform product formed by a process comprising: applying a vacuum to a preform assembly, the preform assembly comprising at least one glass cladding section having one or more axial holes and a top end and a bottom end, with one or more canes respectively residing in the one or more axial holes and a top cap at the top end and a bottom cap at the bottom end; and heating the vacuum-held preform assembly to just above the glass softening point to consolidate the vacuum-held preform to form the cane-based glass preform.

Another embodiment of the disclosure is a cane-based glass preform product formed by a process comprising: forming one or more axial holes in each of multiple glass cladding sections each having a body, a top end, a bottom end and a perimeter, with each top end having a lip that runs around the perimeter and that defines a top recess, and wherein each axial hole is defined by a cylindrical inner surface of the body; stacking the multiple glass cladding sections so that the axial holes formed in each glass cladding section are axially aligned, with the stacked multiple glass cladding sections having an overall stack length LS, an uppermost glass cladding section and a lowermost glass cladding section; inserting one or more glass canes into the respective one or more aligned axial holes of the multiple glass cladding sections such that there is a gap between each glass cane and the cylindrical inner surface of the axial hole in which it resides; interfacing a glass top cap with the top end of the uppermost glass cladding section and interfacing a glass bottom cap with the bottom end of the lowermost glass cladding section to define a preform assembly having a substantially sealed internal chamber that includes the top recess and the gaps; applying a vacuum through the glass top cap to the substantially sealed internal chamber to create with respect to an ambient environment a pressure differential that holds together the preform assembly to define a vacuum-held preform assembly; and heating the vacuum-held preform assembly to just above the glass softening point to consolidate the vacuum-held preform assembly to form the glass preform.

Another embodiment of the disclosure is a cane-based glass preform assembly product formed by a process comprising: forming one or more axial holes in at least one glass cladding section, the at least one cladding section having a top end and a bottom end; adding one or more canes to the respective one or more axial holes so that each axial hole includes a cane; capping the top and bottom ends to form a preform assembly having a substantially sealed internal chamber that pneumatically connects the top and bottom ends through the axial holes; and applying a vacuum to the substantially sealed internal chamber to create a pressure differential between the substantially sealed internal chamber and an ambient environment to form a vacuum-held preform assembly.

Another embodiment of the disclosure is a cane-based glass preform assembly product for forming a multicore optical fiber formed by a process comprising: stacking multiple glass cladding sections each having multiple axial holes so that the axial holes are aligned, with adjacent glass cladding sections being interfaced with a raised lip that forms an internal cavity, and wherein there is an uppermost and a lowermost glass cladding section; adding a cane to each of the aligned axial holes to define gaps within the axial holes that provide pneumatic communication between the internal cavities; capping the uppermost and lowermost glass cladding sections to define a preform assembly having a substantially sealed internal chamber that comprises the internal cavities and the gaps; and applying a vacuum to the substantially sealed internal chamber to form a vacuum-held preform assembly.

The methods disclosed herein provides a robust and cost-effective process for manufacturing a precision single core or multicore preform. The hole drilling provides precision and robustness. The sealing of axially aligned and stacked glass cladding sections enables the use of short and bulky precision-drilled glass cladding sections. The use of a substantially sealed internal chamber and the application of a vacuum to create a vacuum-held preform assembly obviates the need for a special fixture to hold the preform assembly while it is being consolidated. The sealing of the various glass components of the vacuum-held preform assembly is achieved in all directions simultaneously rather than having to seal in one direction (e.g., vertically) and then another direction (e.g., horizontally). The use of a temperature that is just above glass softening point (and thus substantially below the glass melting point) allows for the surfaces of the various components to have a finely ground finish rather than a polished finish, though a polished finish can certainly be used.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 3A is a top-down view of an example cane-cladding assembly having a single axial cane hole with a circular cross-section that supports a single cane with a circular cross-section.

FIG. 3B is a top-down view of an example cane-cladding assembly having a single axial cane hole with an oval cross-section that supports a single cane with an oval cross-section.

FIG. 3C is a top-down view of an example cane-cladding assembly having a single off-axial cane hole with an oval cross-section that supports a single cane with an oval cross-section.

Some of the drawings include cross-sectional views with angled cross-hatching, which in this disclosure represents a glass material.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. The "vertical" direction is along the z-axis and is also along the direction of gravity, which is assumed to operate in the −z direction.

The expression "comprises" as used herein includes the term "consists of" as a special case, so that for example the expression "A comprises B and C" is understood to include the case of "A consists of B and C."

Relative terms like top, bottom, side, horizontal, vertical, etc. are used for convenience and ease of explanation and are not intended to be limiting as to direction or orientation, with the exception of the term "vertical," whose special use relating to the direction of gravity will be understood from the context of the discussion.

The symbol "μm" stands for micron or micrometer, i.e., $10^{-6}$ meter, while the symbol "nm" stands for nanometer, i.e., $10^{-9}$ meter.

The term "consolidated" as the term is used herein means taking an assembly made of different glass components that are not bonded to one another and heating the assembly to just above the softening point of the glass components so that the glass components can flow and bond or seal to each other to form a unified glass component that maintains the general overall configuration of the glass components, i.e., the glass components do not substantially change their basic shape.

The term "axial hole" means a hole that runs parallel to the axial direction, i.e., parallel to a central axis or centerline.

The term "cylindrical" as used herein means a three-dimensional shape formed by taking a two-dimensional shape and projecting it along a third dimension perpendicular to the plane of the two-dimensional shape. Thus, a cylinder as the term is used herein can have cross-sectional shapes other than circular.

Glass Cladding Section

Figure 1A:
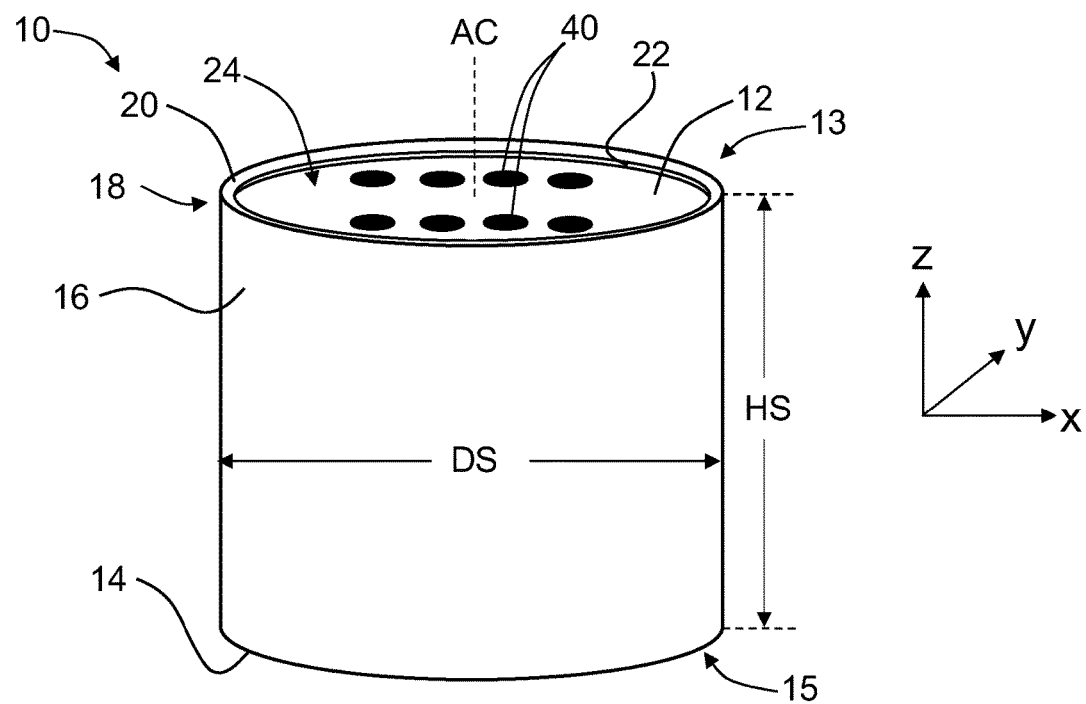
FIG. 1A is an elevated view of an example glass cladding section illustrating an example having eight axial cane holes.
Figure 1B:
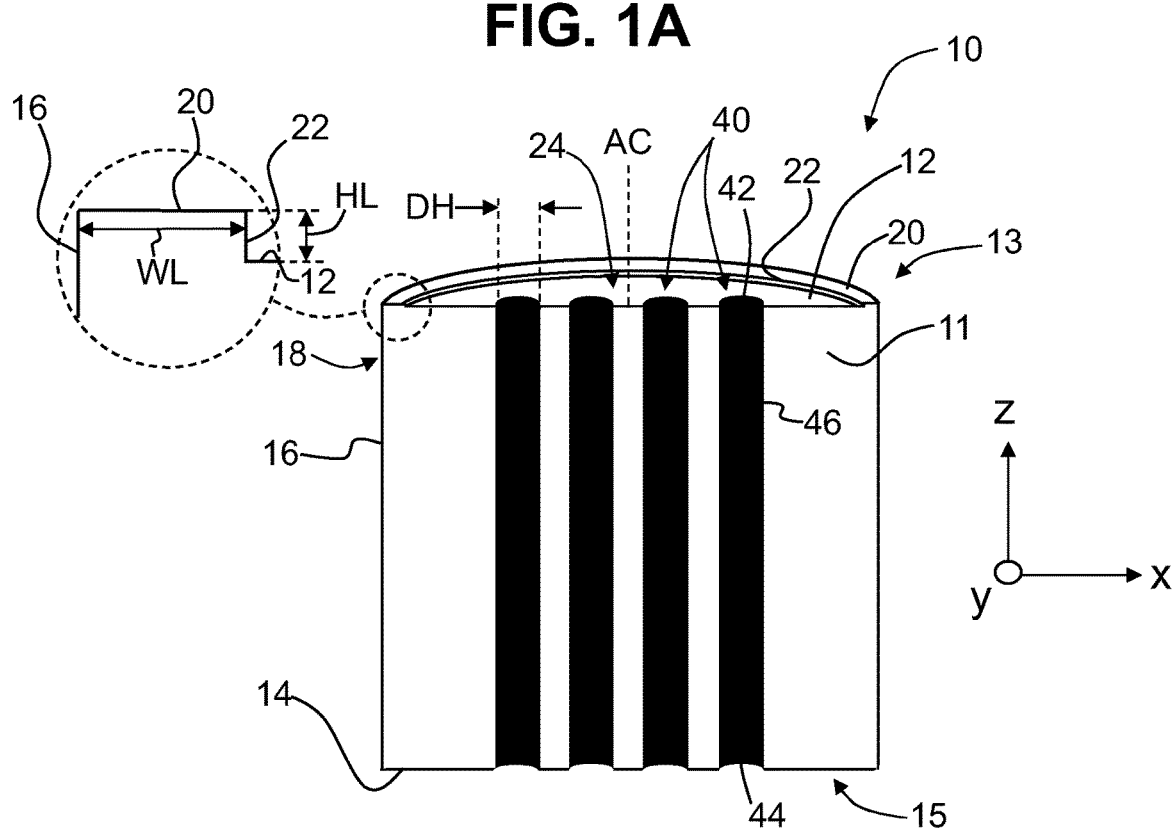
FIG. 1B is an x-z cross-sectional view of the glass cladding section of FIG. 1A.
Figure 1C:
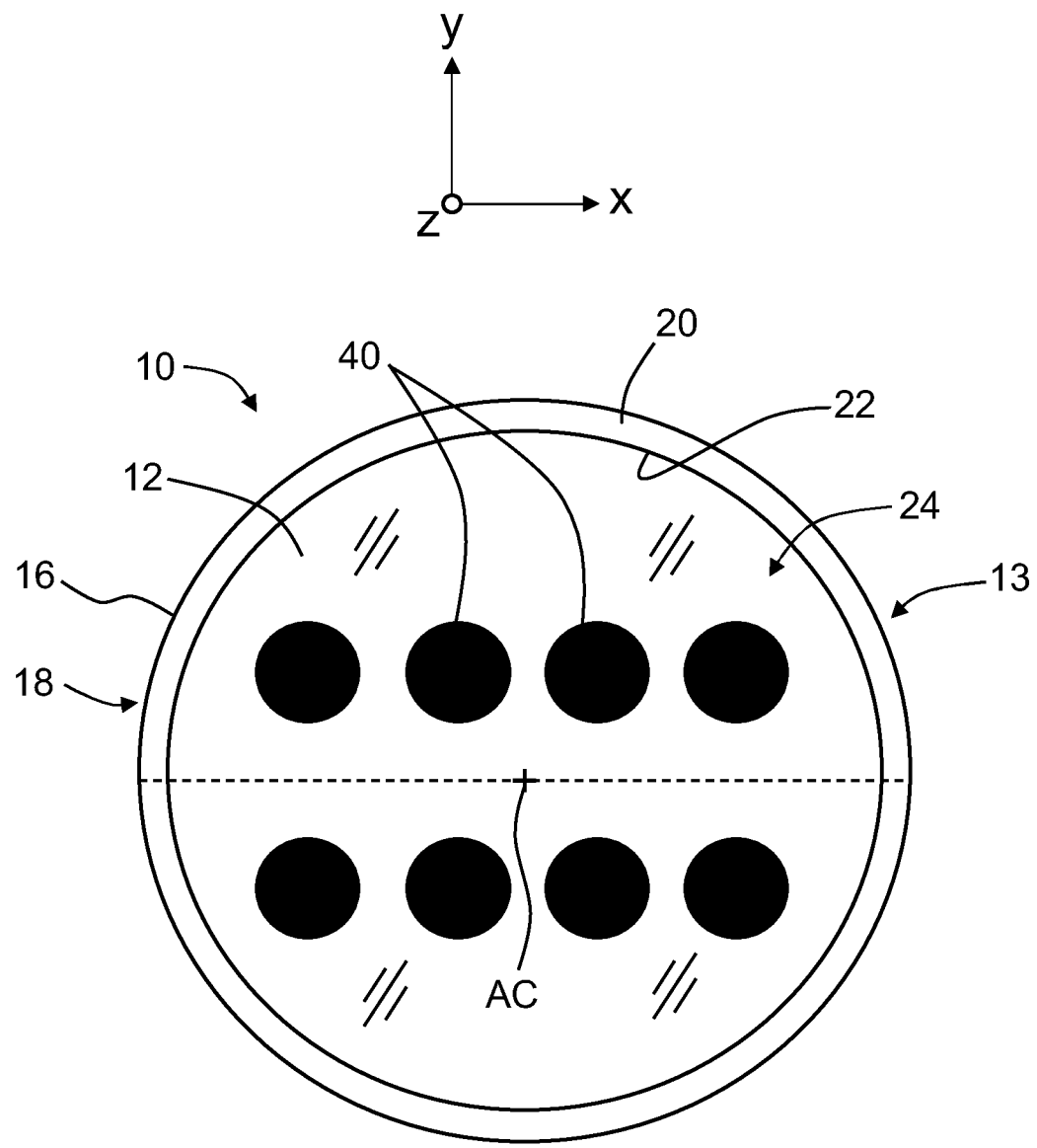
FIG. 1C is a top-down view of the glass cladding section of FIGS. 1A and 1B.

FIG. 1A is an elevated view of an example glass cladding section 10. FIG. 1B is an x-z cross-sectional view of the glass cladding section 10 of FIG. 1A, while FIG. 1C is a top-down view of the glass cladding section of FIGS. 1A and 1B.

The glass cladding section 10 is defined by a cylindrical glass body 11 made of a glass material, which in an example comprises silica, e.g., pure silica or doped silica. The glass cladding section 10 has a central axis or centerline AC, a top surface 12 at a top end 13, a bottom surface 14 at a bottom end 15, and an outer surface 16 that defines a perimeter 18. The glass cladding section 10 has a diameter DS and a height HS. In an example, the diameter DS can be in the range from 50 mm to 150 mm, while the height HS can be in the range from 50 mm to 200 mm. In one example considered herein, the diameter DS is about 70 mm while the height HS is about 110 mm. Other diameters DS and heights HS for the glass cladding section 10 can be effectively employed consistent with the principles and limits of the methods described herein as will be apparent to one skilled in the art. The outer surface 16 can be polished after grinding to obtain a precise diameter DS. The flat top and bottom surfaces 12 and 14 of the glass cladding section 10 can also be polished. In an example, the polishing is carried out to obtain a flatness of about 2 microns over a flat surface.

The glass cladding section 10 includes a raised lip 20 at the top end 13. The raised lip 20 runs around the perimeter 18. Thus, the raised lip 20 can also be referred to as a raised outer lip or a perimeter lip. FIG. 1B includes a close-up inset that shows a cross-sectional view of the raised lip 20. The raised lip 20 has a flat surface that is parallel to the top surface 12. In an example, the raised lip 20 is finely ground or polished.

The raised lip 20 includes an inner wall 22. The inner wall 22 and the top surface 12 define a recess 24 at the top end 13. The raised lip 20 has a width WL and a height HL. In an example, the width WL is in the range from 2.5 mm to 10 mm (e.g., 5 mm) while the height HL can range from 0.25 mm to 1 mm (e.g., 0.5 mm). The purposes of the raised lip 20 and the recess 24 are discussed in greater detail below.

Consider a glass cladding section 10 having a diameter DS of 70 mm, a height HS of 100 mm, and a raised lip of width WL of 5 mm and a height HL of 0.5 mm. The volume VS of a solid glass cladding section 10 (i.e., without the recess 24 or the axial holes, described below) is $VS=\pi[DS/2]^2(HS)=\pi[35 \text{ mm}]^2(100 \text{ mm})\approx 3.8\times 10^5 \text{ mm}^3$. The volume VR of the recess 24 is $VR=\pi[\{DS-2(WL)\}/2]^2(HL)=1.4\times 10^3 \text{ mm}^3$. The relative size (volume) of the recess 24 as compared to the total volume of a solid glass cladding section 10 is VR/VS≈0.004, or about 0.4%.

The glass cladding section 10 includes one or more through axial holes 40 of diameter DH. The example glass cladding of FIGS. 1A through 1C show eight axial holes 40. Each axial hole 40 is cylindrical and is defined an open top end 42, an open bottom end 44 and a cylindrical inner surface 46 of the glass body 11. The example axial holes 40 are shown as having a circular cross-sectional shape and having the same diameter DH by way of example. In other embodiments, the axial holes 40 can have different sizes (diameters) and different cross-sectional shapes. The one or more axial holes 40 can be formed by precision drilling, e.g., by diamond abrasive core drilling and/or ultrasonic assisted core drilling.

The use of larger diameter glass cladding sections 10 allows for less stringent absolute tolerance positioning of the axial holes given the reduction ratio effect during the draw process when forming the optical fiber. In an example, the relative tolerance on the center-to-center position of the axial holes 40 is about 0.2% with respect to the diameter DS of the glass cladding section. By way of example, this translates to a 0.25 mm tolerance for a glass cladding section diameter DS=125 mm, which corresponds to a 0.25 micrometer tolerance of the position of individual cores in a 125 μm fiber. Precision drilling of the axial holes 40 using drilling techniques known in the art can meet this example precision target.

Cane-Cladding Assembly

Figure 2A:
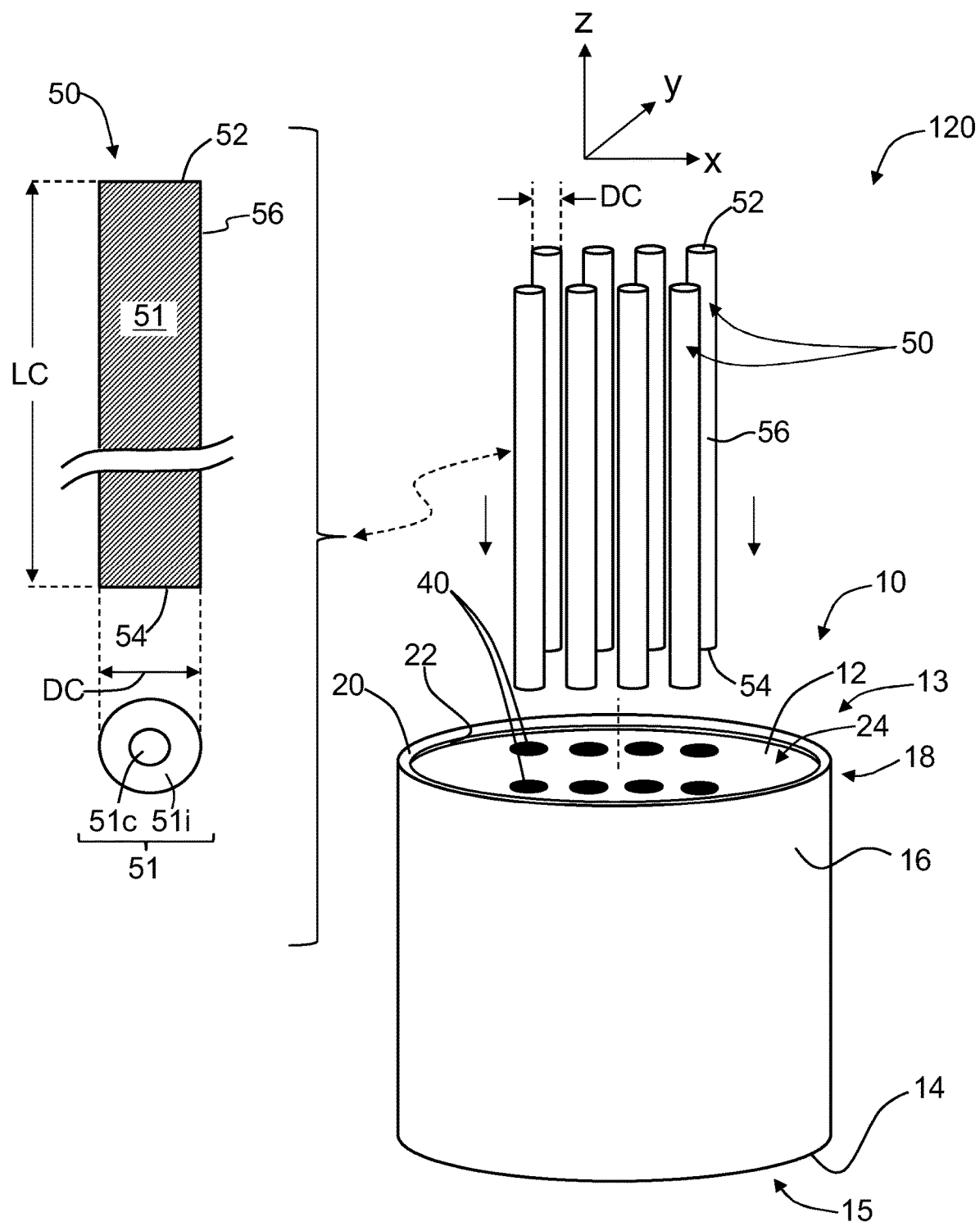
FIG. 2A is similar to FIG. 1A and is an exploded view of a cane-cladding assembly that shows eight canes being inserted into the corresponding axial cane holes of the glass cladding section.
Figure 2B:
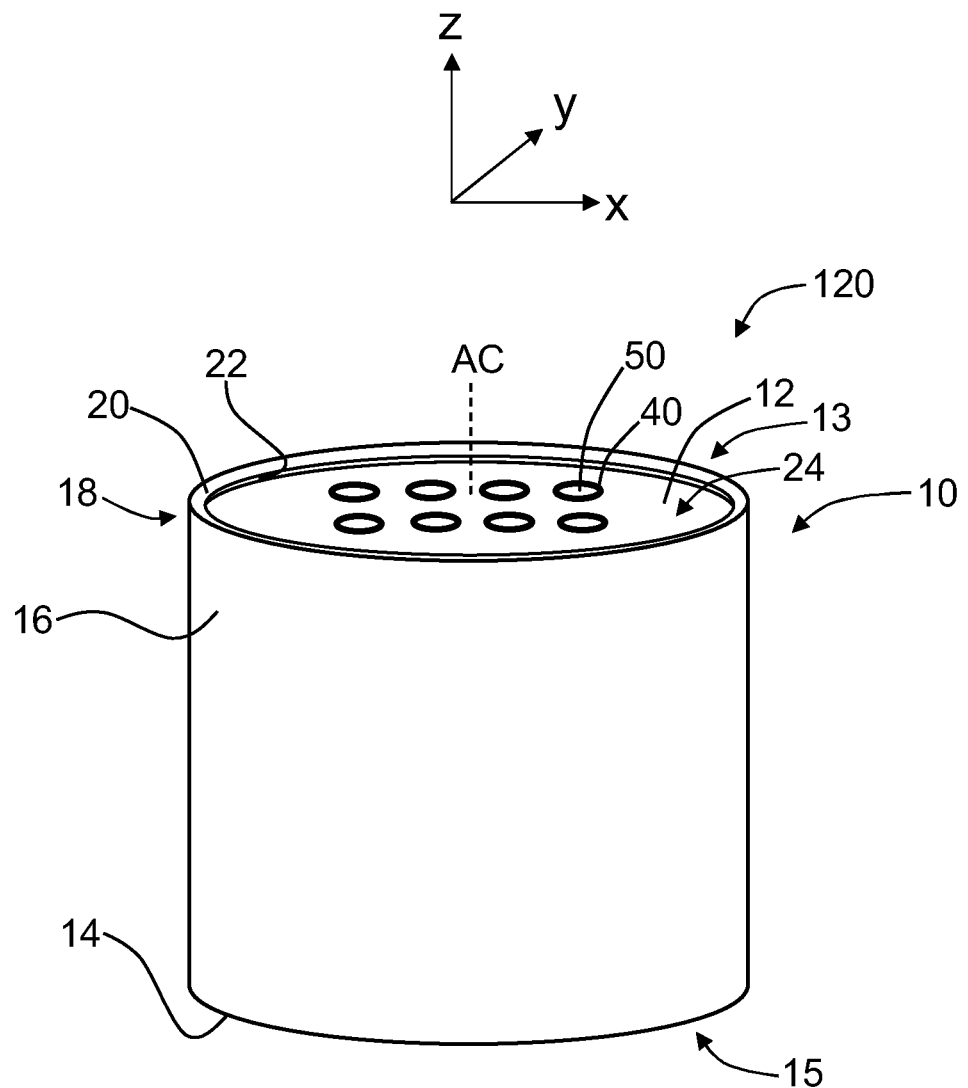
FIG. 2B is similar to FIG. 2A and shows the eight canes residing in the respective eight axial cane holes to define a cane-cladding assembly.
Figure 2C:
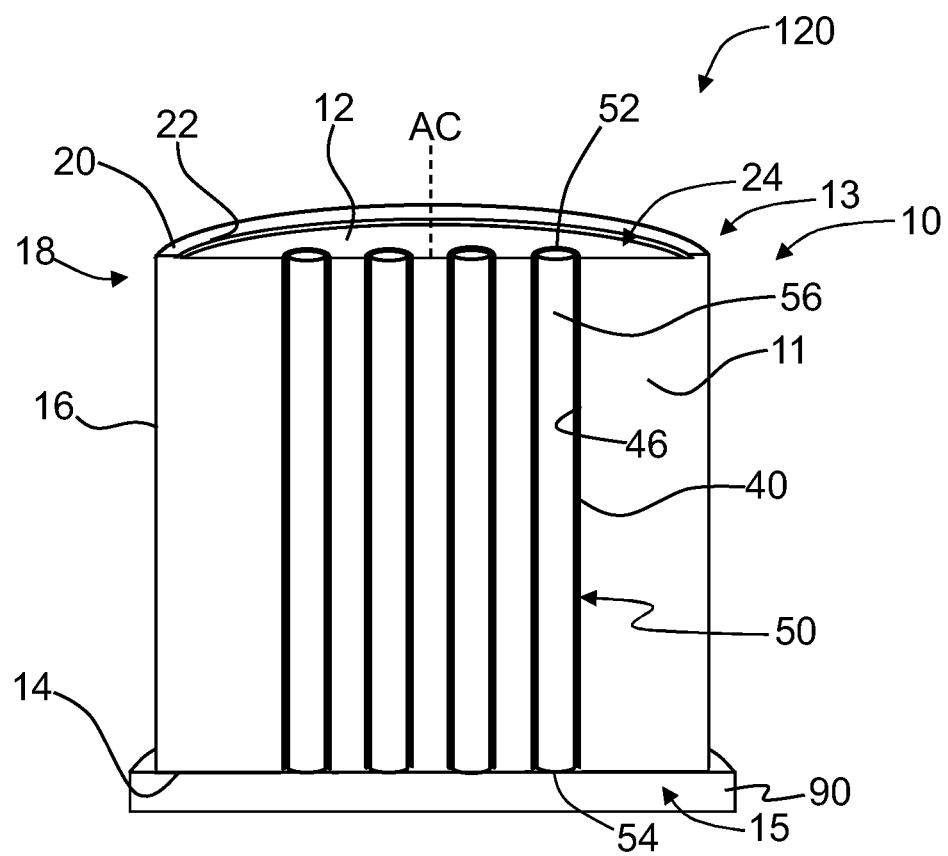
FIG. 2C is an x-z cross-sectional view of the cane-cladding assembly of FIG. 2B.
Figure 2D:
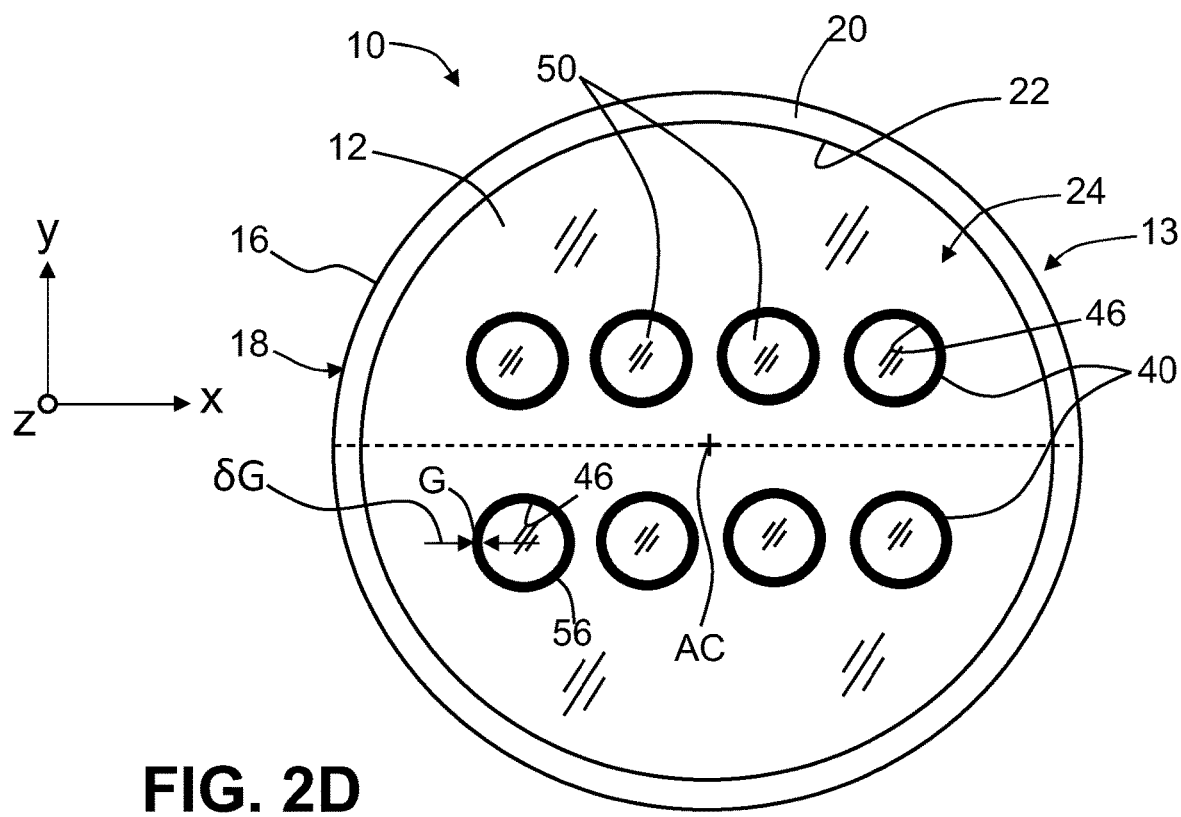
FIG. 2D is a top-down view of the cane-cladding assembly of FIGS. 2B and 2C.

FIG. 2A is similar to FIG. 1A and is an exploded view that shows the glass cladding section 10 and eight canes 50 operably disposed relative to the eight axial holes 40 in the process of forming a cane-cladding assembly 120. FIG. 2B shows the example assembled cane-cladding assembly 120. FIG. 2C is an x-z cross-sectional view while FIG. 2D is a top-down view of the example cane-cladding assembly 120.

FIG. 2A includes a close-up inset showing an example cane 50. Each cane 50 has a glass body 51 that defines a top end 52, a bottom end 54 and an outer surface 56 of the cane. The cane 50 has an axial length LC. The glass body 51 can comprise a core section 51c and an inner cladding section 51i that immediately surrounds the core section. The inner cladding section 51i can have one or more inner cladding portions of different refractive index. The glass body can also consist of just a core section 51c. In an example, the cladding section 51i can comprise one or more undoped or down-doped inner claddings sections. Generally speaking, the cane 50 can have any refractive index profile that can be made using known techniques in the art and as needed to achieve desired properties of the resulting optical fiber.

The cane 50 has a diameter DC, which is slightly smaller than the diameter DH of the corresponding axial hole 40 so that the cane 50 can fit into the axial hole. In an example, there is a gap G between the outer surface 56 of the cane 50 and the inner surface 46 of the axial hole, wherein the gap has a gap size δG (see also the close-up inset of FIG. 5C). In one example, the gap G is sized so that the canes 50 just fit into the axial holes 40, e.g., the fit is tight but is not an interference fit. For example, the axial hole diameter DH can be 10 mm and the cane diameter DC can be 9.98 mm, so that the gap size δG=(DH−DC)/2=0.01 mm or 10 microns. On the other hand, the gap size δG can be relatively large since in the consolidation process described below, relatively large spaces within the interior of the glass cladding section 10 can be collapsed. In an example, the gap size δG is preferably about 0.1 mm or less (e.g., 0<δG≤0.1 mm) so that there is no substantial distortion of the glass body 11 of the glass preform section 10 during the consolidation process.

As described in greater detail below, the gaps define annular conduits that support the flow of gas when pulling a vacuum. Each axial hole 40 has a volume $VH=\pi[DH/2]^2$ (HS). For DH=10 mm and HS=100 mm, VH≈7850 mm³. In contrast, the volume VC of the cane 50 is given by $VC=\pi[DC/2]^2(HS)$, which for DC=9.98 mm gives VC=7818 mm³. The gap volume VG=VH−VC, which in the above example is 32 mm³, which is about 0.4% of the axial hole volume. As noted above, larger gap sizes δG and thus larger gap volumes VG can also be used.

Figure 2E:
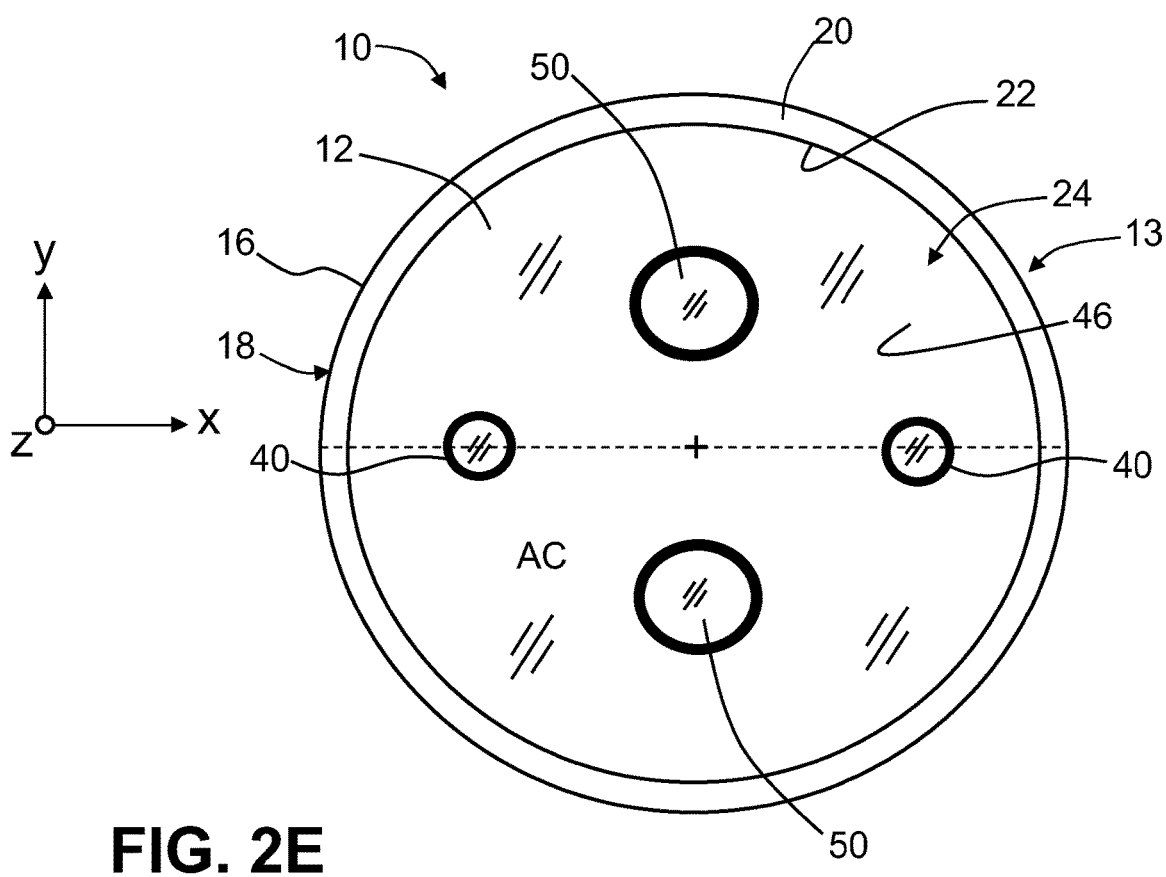
FIG. 2E is similar to FIG. 2D, but illustrates an embodiment where the axial holes and the canes do not have the same respective axial hole and cane diameters.

FIG. 2E is similar to FIG. 2D and illustrates an example where the axial holes 40 do not have all the same diameters DH and the canes 50 likewise do not all have the same cane diameters DC. In an example shown in FIG. 2C, a bottom cap 90 can be used to support the canes 50 within the axial holes 40 while the cane-cladding assembly 120 is in the vertical position. An example configuration for the bottom cap 90 is described in greater detail below.

FIGS. 3A through 3C are top-down views similar to that of FIG. 2D but illustrating examples where the glass cladding section has a single axial hole 40 that accommodates a single cane 50. FIG. 3A shows an example where the axial hole 40 has a round cross-sectional shape and is co-axial with the centerline AC of the glass cladding section 10. FIG. 3B is similar to FIG. 3A, except that the axial hole 40 and the corresponding cane 50 have oval cross-sectional shapes. FIG. 3C is similar to FIG. 3B and illustrates an example where the single axial hole 40 and the corresponding single cane 50 are off-axis.

Preform Assembly

Figure 4A:
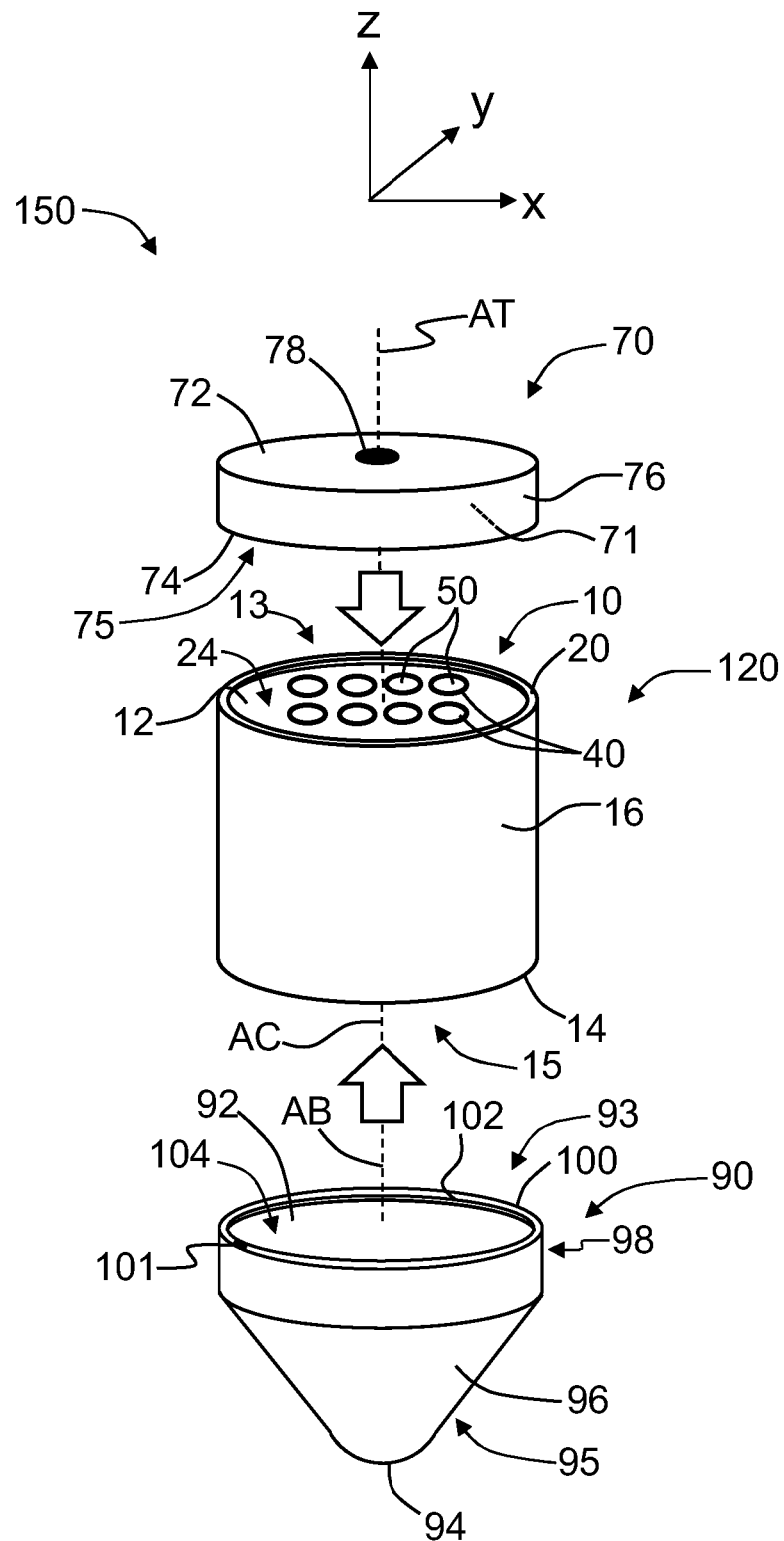
FIG. 4A is a partially exploded view of a preform assembly that shows the glass cladding section, the canes added to the axial cane holes of the glass cladding section (to form the cane-cladding assembly), a cone-shaped bottom-end cap and a planar end cap having a through hole.

FIG. 4A is a partially exploded view of an example preform assembly 150 formed using the cane-cladding assembly 120 of FIG. 2B. The preform assembly 150 includes a top cap 70 that interfaces with the raised lip 20 at the top end 13 of the glass cladding section 10. The preform assembly 150 also includes the aforementioned bottom cap 90 interfaced with the bottom end 15 of the glass cladding section 10. Both the top and bottom caps 70 and 90 comprise glass, e.g., the same glass as the glass cladding section 10.

In an example, the top cap 70 has a body 71, a central axis AT, a top end 72, and bottom surface 74 at a bottom end 75. The top cap 70 also includes an axial through hole 78 that is open at the top end 72 and the bottom end 74. In an example, the axial hole 70 is co-axial with the central axis AT.

Figure 4B:
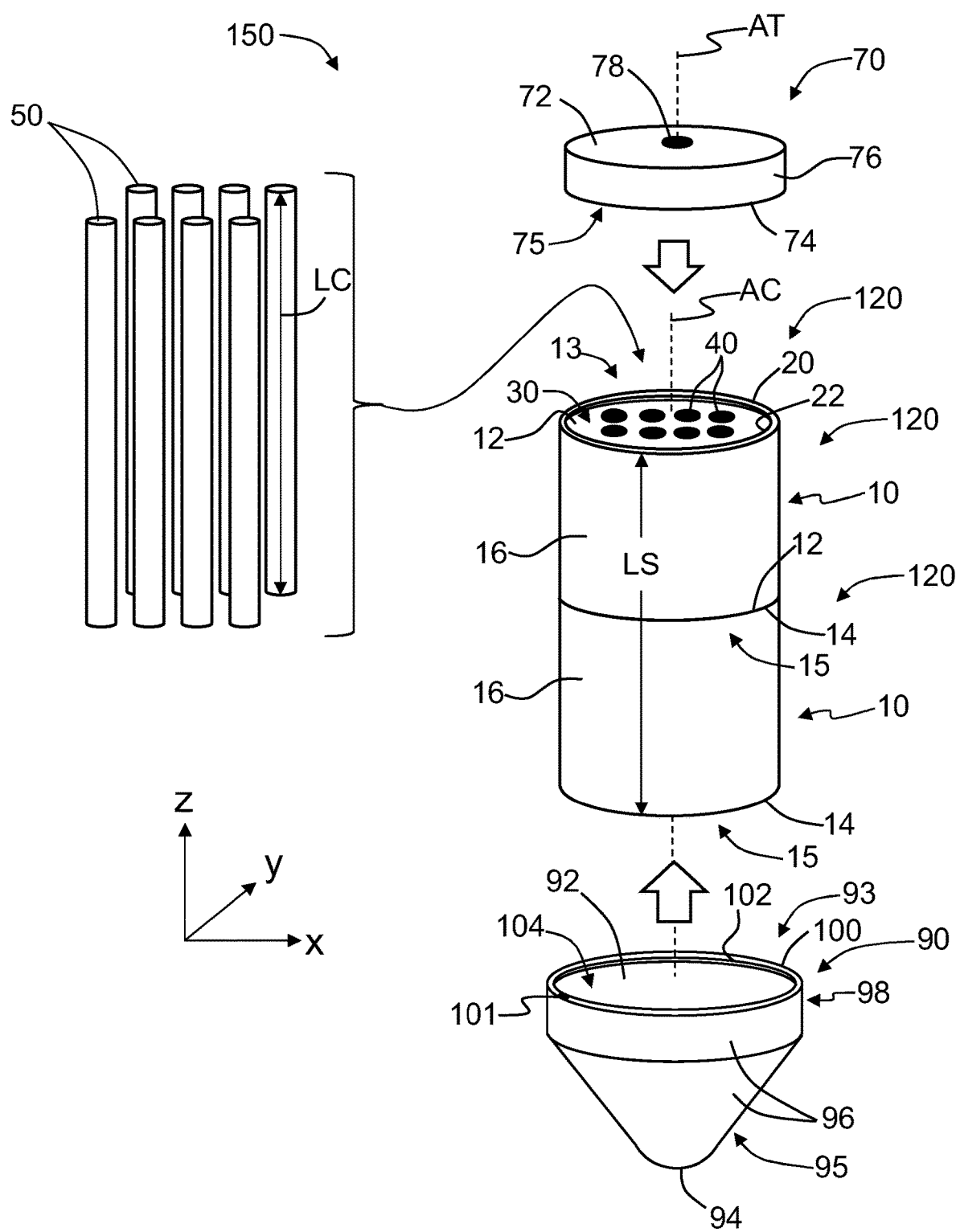
FIG. 4B is similar to FIG. 4A and shows an example wherein the preform assembly employs two axially arranged glass cladding sections with the axial cane holes aligned, and wherein the canes are sized to extend through the respective aligned axial cane holes of the two glass cladding sections.

FIG. 4B is similar to FIG. 4A and shows an example wherein the preform assembly 150 employs two axially arranged glass cladding sections 10 with the axial cane holes 40 of the two different glass cladding sections being axially aligned. In this example, the canes 50 have a cane length LC such that the canes extend through the respective aligned axial cane holes 40 of the two stacked and aligned glass cladding sections 10, which collectively have an axial length LS. Thus, in this example, the two cane-cladding assemblies 120 share the same canes 50, which in an example have a cane length LC that is the substantially the same the axial length LS of the stacked glass cladding sections 10 of the preform assembly 150. Thus, in some embodiments, the cane length LC is greater than the height HS of a single glass cladding section 10. In other examples, more than two glass cladding sections 10 can be combined to form the preform assembly 150 using suitably long canes 50. When the preform assembly 150 comprises stacked glass cladding sections 10, there is an uppermost glass cladding section that received the top cap 70 and a lowermost glass cladding section that receives the bottom cap 90.

With reference to FIGS. 4A and 4B, in an example the bottom cap 90 is made of glass (e.g., the same glass as the glass cladding 10) and has a conic shape to benefit the final shape of the preform for drawing an optical fiber. The bottom cap 90 includes a top surface 92 at a top end 93, a conic portion 95 of an outer surface 96 and a bottom end 94. The cap 90 has a perimeter 98 at the top end 93. In an example, the top end 93 can consist of the flat surface 92. In the example shown, the top end 93 includes a raised lip 100 at the top end 93 at the perimeter 98. The raised lip has a flat polished surface and defines an inner wall 102. The inner wall 102 and the top surface 92 define a recess 104. In an example, the raised lip 100 optionally includes a small passage 101 that connects the recess 104 to the outer surface 96. The purpose of the optional passage 101 is discussed below. In an example, the various glass parts of the preform assembly 150 are cleaned, e.g., acid washed and rinsed with DI water, before being assembled.

Preform System

Figure 5A:
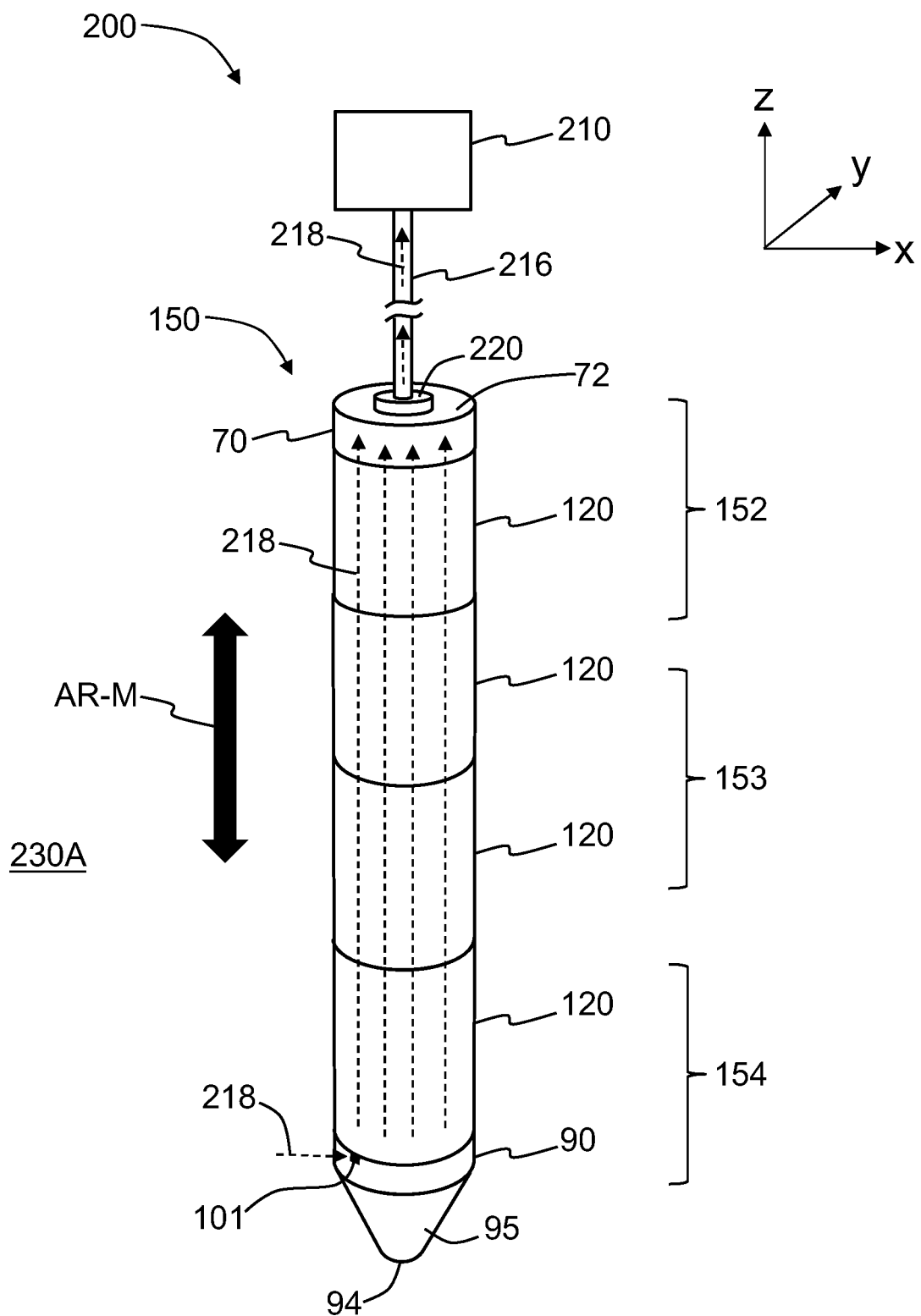
FIG. 5A is a top elevated view of an example preform system formed by operably attaching the preform assembly to a vacuum system that mechanically supports the preform assembly while generating a vacuum that keeps the glass cladding sections and the end caps of the preform assembly together.

FIG. 5A is a top elevated view of an example preform system 200 formed using the preform assembly 150. The example preform assembly 150 shown in FIG. 5A is formed using four cane-cladding assemblies 120 with suitably long canes 50 (e.g. canes 50 with lengths LC that approximate the length LS of the four cane-cladding assemblies 120 combined). The preform system 200 includes a vacuum system 210. The vacuum system 210 is pneumatically connected to the preform assembly 150 at the top cap 70 via a vacuum conduit 216. The preform system 200 is shown residing in an ambient air environment 230A. The preform assembly 150 is shown as having a top-end portion 152, a central portion 153 and a bottom-end portion 154. The preform system 200 is used to carry out the vacuum-based methods of forming a cane-based glass preform as disclosed herein. Note that the example preform system 200 includes a top-end portion 152 closest to the vacuum system and a bottom-end portion 154 at the opposite end.

Figure 5B:
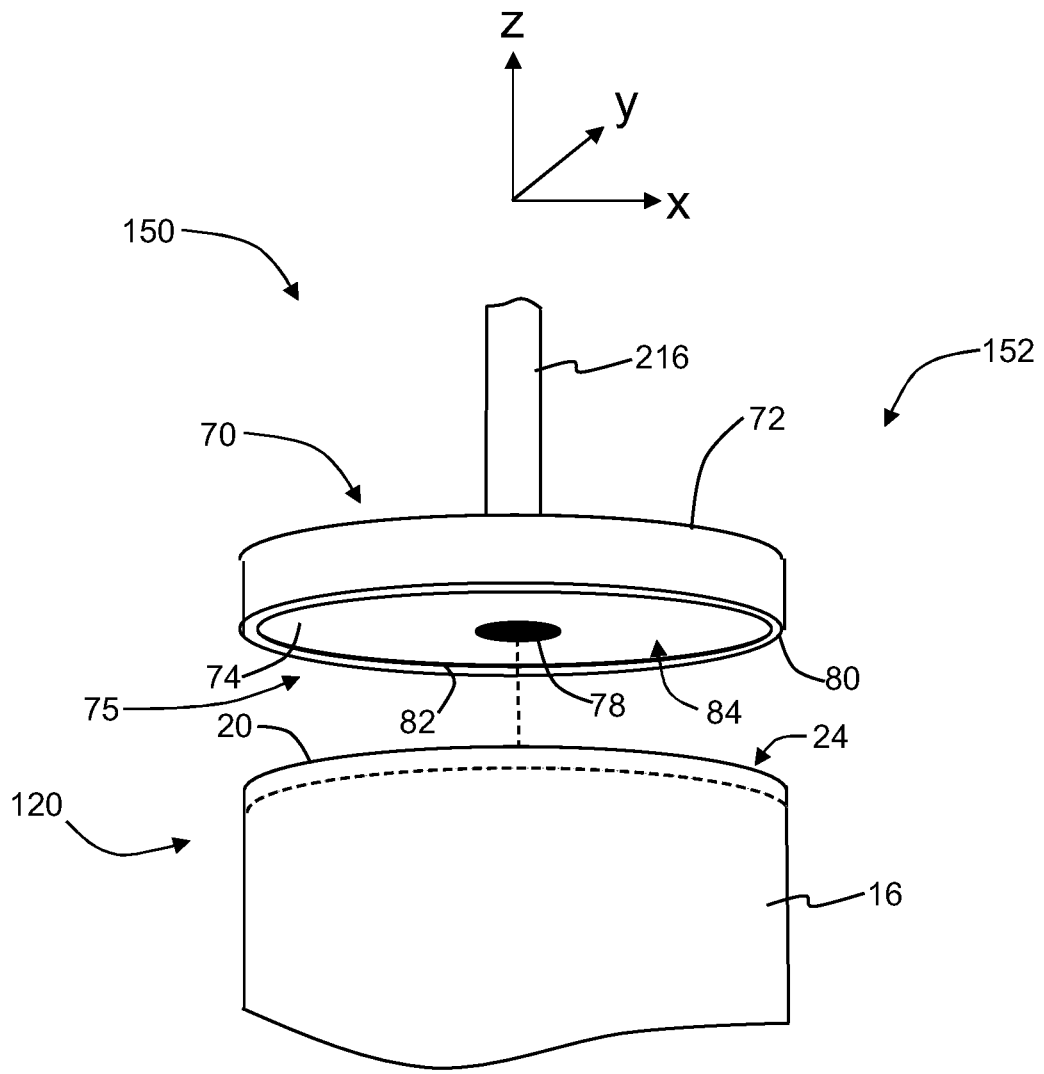
FIG. 5B is a close-up bottom elevated and partially exploded view of the top section of the preform assembly, illustrating how the top-end cap interfaces with the top end of the uppermost glass cladding section.
Figure 5C:
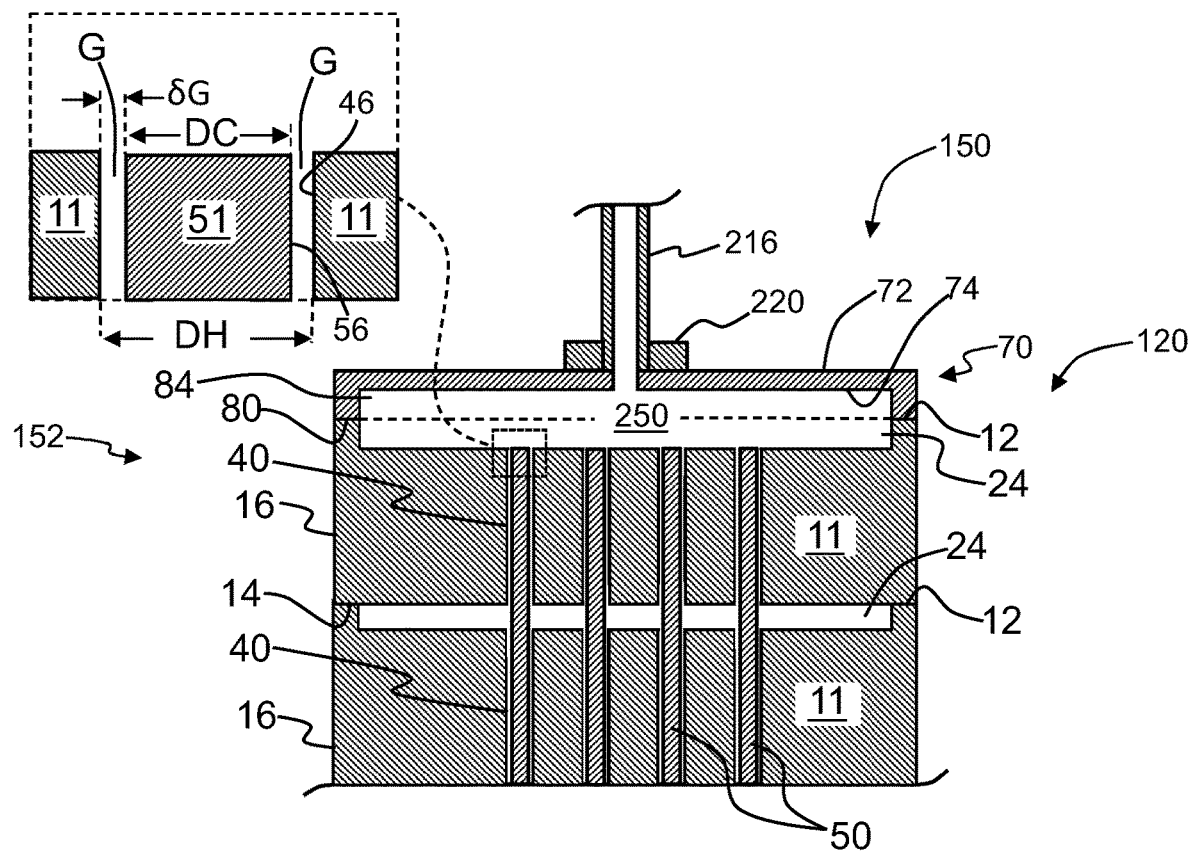
FIG. 5C is a cross-sectional view of the top section of the preform assembly of FIG. 5A showing the internal cavities defined by the recessed portions of the glass cladding sections and also showing the space between the interior walls of the axial cane holes and the outer surfaces of the canes residing in the respective cane holes, wherein the cavities and the spacings provide the pneumatic communication of the vacuum to create a pressure differential with the ambient environment that keeps the preform assembly together.

FIG. 5B is a close-up, bottom elevated and partially exploded view of the top-end portion 152 of the preform assembly 150, illustrating how the top cap 70 interfaces with the lip 20 of the top end 13 of the glass cladding section 10 of the uppermost cane-cladding assembly 120. FIG. 5C is a close-up cross-sectional view of the top section of the preform assembly 150 and the top cap 70 operably arranged thereon. In an example, the vacuum conduit 216 is attached to the top end 72 of the top cap 70 using a securing member 220 so that the vacuum conduit is in pneumatic communication with the axial hole 78 of the top cap. In an example, the top cap 70 and vacuum conduit 216 both comprise glass and the securing member 220 comprises a glass weld. In an example, the vacuum conduit 216 is configured to mechanically support the preform assembly 150 while allowing the preform assembly 150 to be movable in the z-direction, as discussed below.

In an example best seen in FIG. 5B, the top cap 70 can include a lip 80 at the perimeter of the bottom end 75. The lip 80 defines an inner wall 82 that together with the bottom surface 74 defines a recess 84. In an example, the lip 80 of the top cap 70 interfaces with the lip 20 of the glass cladding section 10 of the uppermost cane-cladding assembly 120 of the preform assembly 150. These flat, fine-ground surfaces become almost airtight when pulling a vacuum, as described below.

Figure 5D:
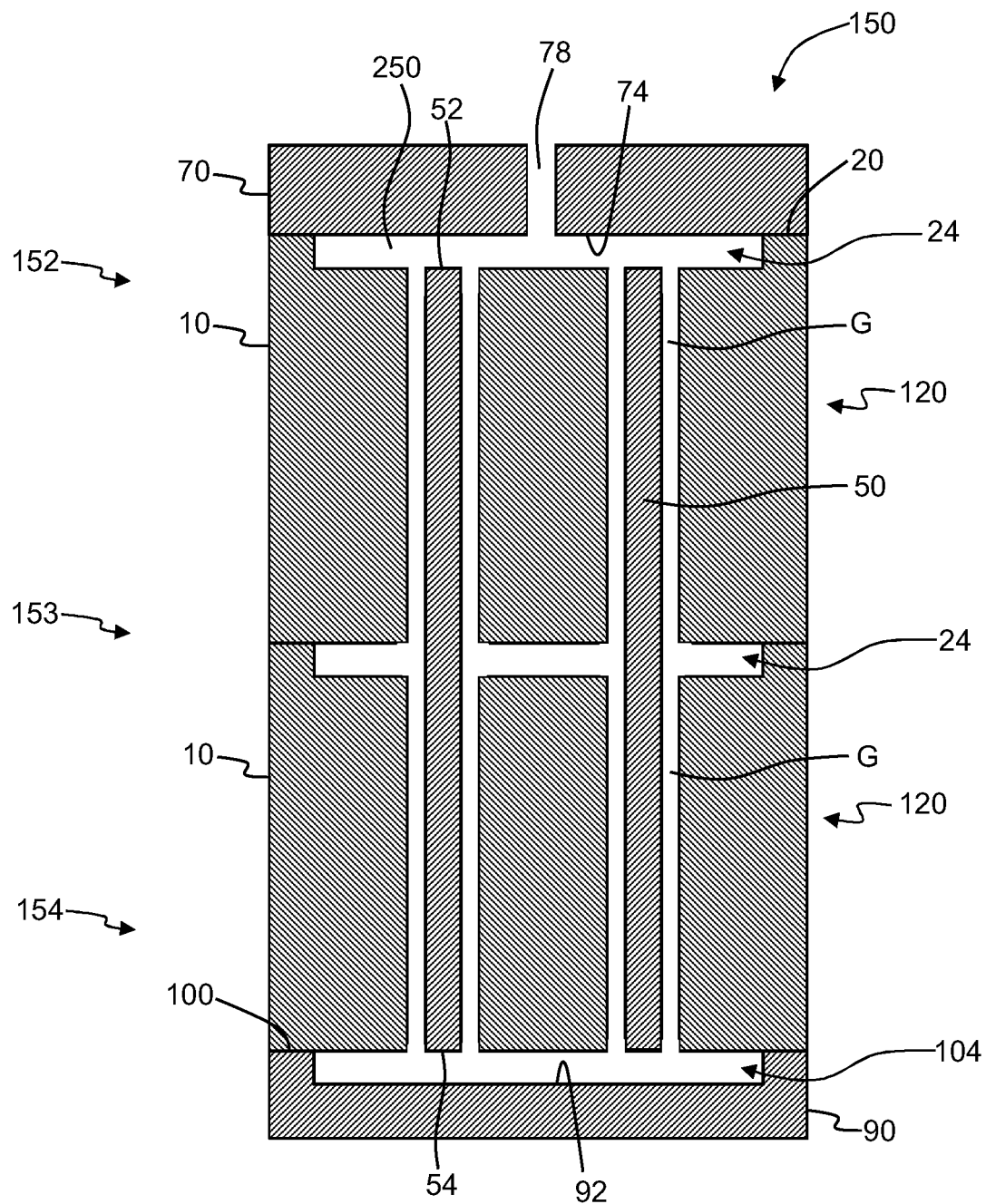
FIGS. 5D and 5E are full cross-sectional views of an example preform assembly made up of two glass-cladding sections and showing examples of an internal chamber defined by the two recesses of the glass cladding sections, the gaps defined by the canes and axial holes, and the recess of the end cap, with the example of FIG. 5E showing longer canes.
Figure 5E:
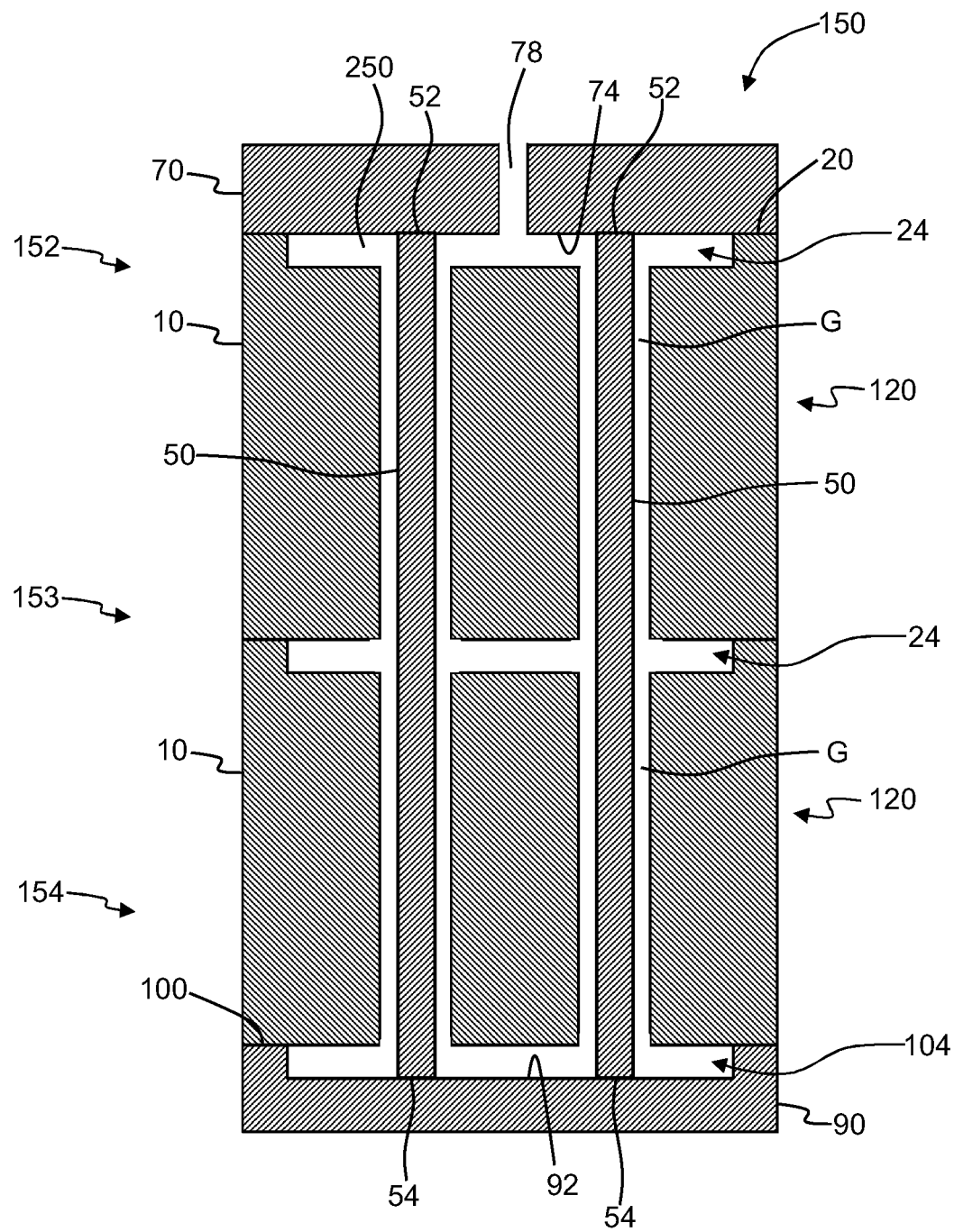

As best seen in the cross-sectional view of FIG. 5C and the full cross-sectional view of FIG. 5D, the preform assembly 150 includes an internal chamber 250 formed by the axial holes 40 of the glass cladding sections 10 of the uppermost cane-cladding assembly 120 and by the recess 24 of the top end 13 of the glass cladding sections 10 of the uppermost cane-cladding assembly 120. The internal chamber 250 can also be defined in part by the optional recess 84 of the top cap 70 and the optional recess 104 of the bottom cap 90. The internal chamber 250 is actually defined in part by the gaps G, which as noted above are defined as the space between the outer surface 56 of the canes 50 and the inner surfaces 46 of the axial holes 40. Thus, the internal chamber 250 is made up of relatively small gaps and recesses, which is advantageous when pulling a vacuum. FIG. 5E shows another example similar to that shown in FIG. 5D wherein canes 50 can have sufficient length to contact the top surface 92 of the bottom cap 90 and the bottom surface 74 of the top cap 70

The full x-z cross-sectional view of FIG. 5D shows an example preform assembly 150 made up of two glass-cladding sections 10 and showing an example of an internal chamber 250. The example internal chamber 250 is defined by the two recesses 24 of the glass cladding sections 10, the gaps G defined by the canes 50 and the respective axial holes 40 in which they reside, and the recess 104 of the bottom cap 90. The internal chamber 250 is configured to provide a pneumatic path between the recess 24 and the recess 84 to the top surface 92 of the bottom cap 90, or alternatively to the recess 104 of the bottom cap 90. The optional passage 101 is not shown in the bottom cap 90. The internal chamber 250 is said to be substantially sealed because the various surfaces that are in contact are sufficiently smooth so that they can sustain a pressure differential when a vacuum is applied to the internal cavity. The raised lips 20 of the glass cladding sections 10 and the raised lip 100 of the bottom cap 90 help to form a seal by reducing the amount of surface area in contact with the adjacent surface so that the force per area (i.e., pressure) is increased.

The preform assembly 150 is held together by applying a vacuum from the vacuum system 210 to the internal chamber 250 via the vacuum conduit 216 and the axial hole 78 in the top cap 70. The vacuum pulls air from the internal chamber 250, as denoted by air flow lines 218 in FIG. 5A. Since the internal chamber 250 is substantially sealed, pulling a vacuum creates a substantial pressure differential $\Delta P$ between the internal chamber 250 and the ambient environment 230A. This pressure differential $\Delta P$ acts to squeeze together the bottom cap 90, the stacked cane-cladding assemblies 120 and the top cap 70 of the preform assembly 150 when oriented vertically, i.e., against gravity. In an example, the pressure differential $\Delta P$ between full vacuum and normal ambient pressure at sea level provides axial compressive force of 98 kg on a typical assembly having outside diameter DS of 122 mm and the inner chamber diameter of 112 mm. More generally, the pressure differential can be on the order of 100 kg, with the exact value depending on the weight of the various components of the preform assembly 150 and the sizes of the various sections of the internal chamber 250, as will be apparent to one skilled in the art. Thus, the application of the vacuum forms a vacuum-held-together ("vacuum-held") preform assembly 150. It is this vacuum-held preform 150 that is processed in the steps described below.

The vacuum conduit 216, as noted above, can have sufficient strength to mechanically support the preform assembly 150 in the vertical orientation when the vacuum is applied. In an example, the preform system 200 is configured so that the preform assembly 150 can be moved vertically, as indicated by the movement arrow AR-M in FIG. 5A. This can be enabled in a variety of ways known in the art, including having the vacuum conduit 216 that is extendable, e.g., by being comprised of nested and telescoping vacuum pipes (not shown) that can axially slide with respect to one another in a controlled manner to extend (and contract) the vacuum conduit while maintaining vacuum.

The example of FIG. 5A shows the optional passage 101 in the bottom cap 90. This notch allows a small amount of air in the ambient air environment 230A to flow into the internal chamber 250 when pulling a vacuum. In an example, the ambient environment can be one other than air, such as filtered nitrogen or other inert gas or inert gas with chlorine to dry the internal chamber 250 and remove impurities out of the internal chamber 250 and/or to keep impurities from entering the internal chamber 250.

Figure 5F:
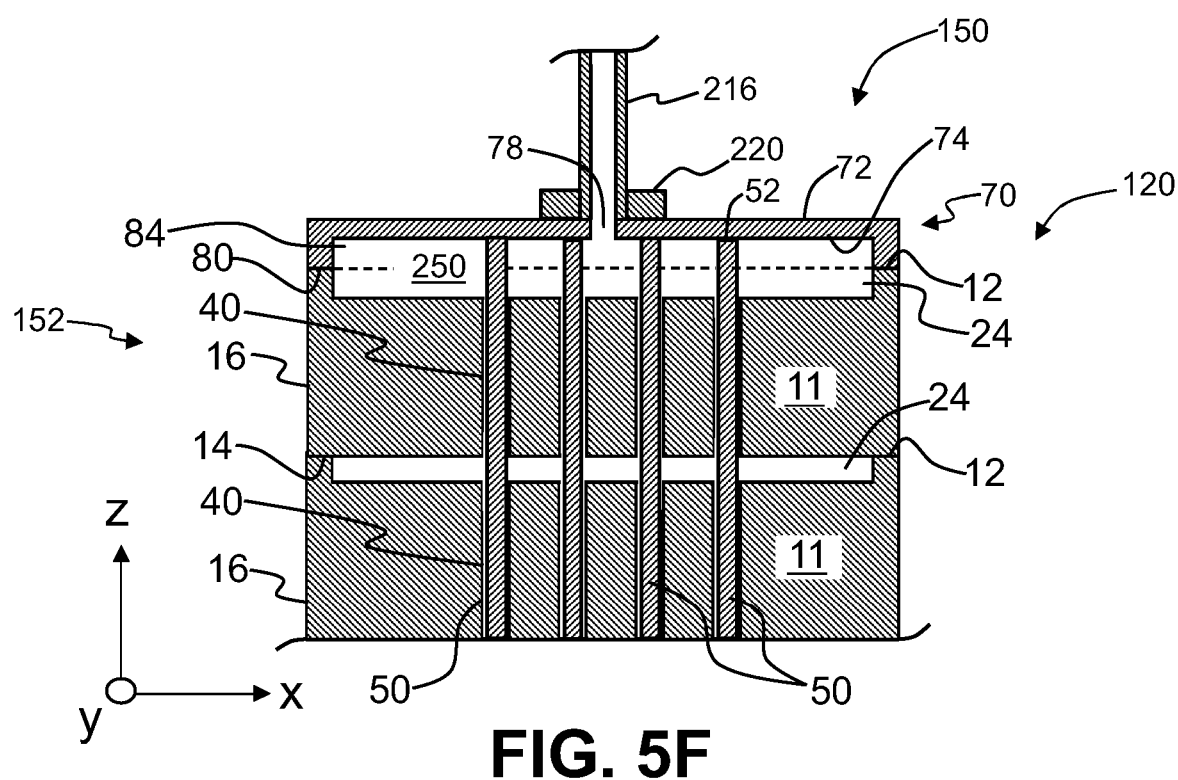
FIG. 5F is similar to FIG. 5C and illustrates an example configuration of the preform assembly where the canes contact the bottom surface of the top cap.

FIG. 5F is similar to FIG. 5C and illustrates an example configuration of the preform assembly 150 where the top ends 52 of the canes 50 contact the bottom surface 74 of the top cap 70. This embodiment is useful when the amount of vacuum is sufficiently strong to pull the canes 50 out of the axial holes 40.

Figure 5G:
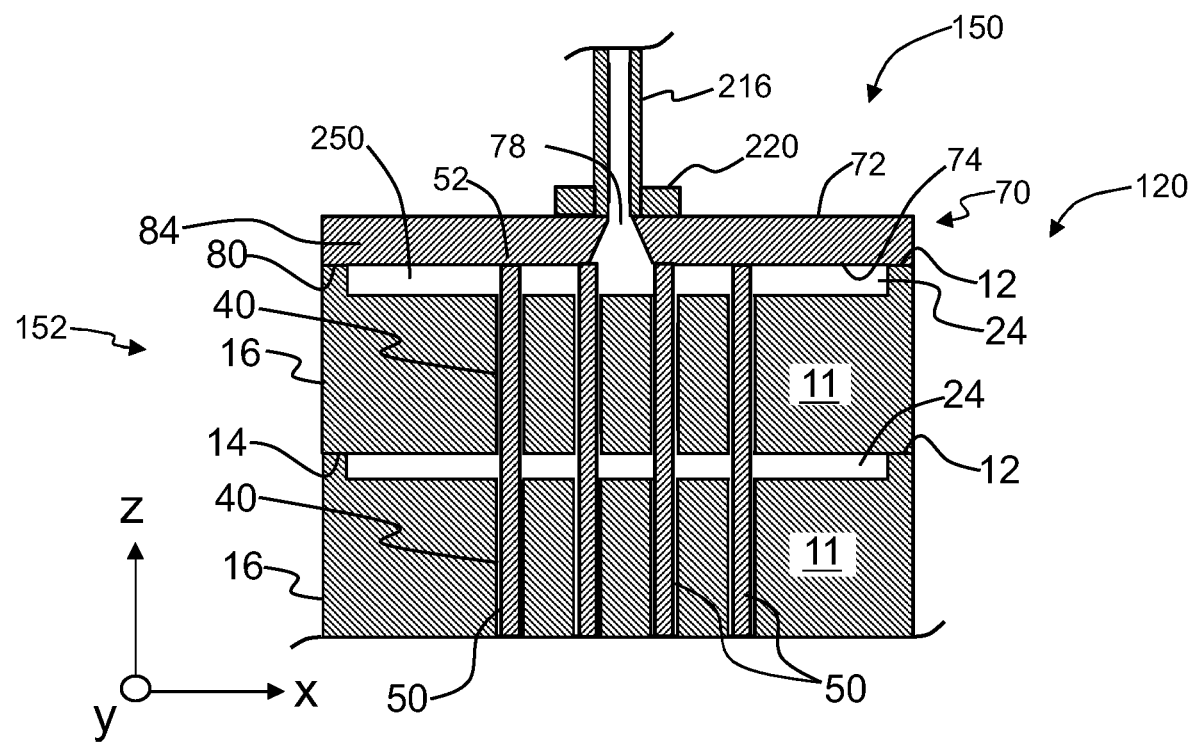
FIG. 5G is similar to FIGS. 5C and 5F and shows an example where the bottom of the top cap is flat so that the top internal chamber is defined by the recess in the uppermost cladding section.

FIG. 5G is similar to FIGS. 5C and 5F and shows an example where the bottom surface 74 of the top cap 70 is flat (i.e., there is no lip 80) so that the uppermost portion of the internal chamber 250 is defined by the recess 24 in the cladding section 10 of the uppermost cane-cladding assembly 120. FIG. 5G also shows an example of a flared axial hole 78 in the top plate 70. Such a shape for the axial hole 78 can help the flow of air (gas) through the internal chamber 250 to the vacuum conduit 216.

Figure 5H:
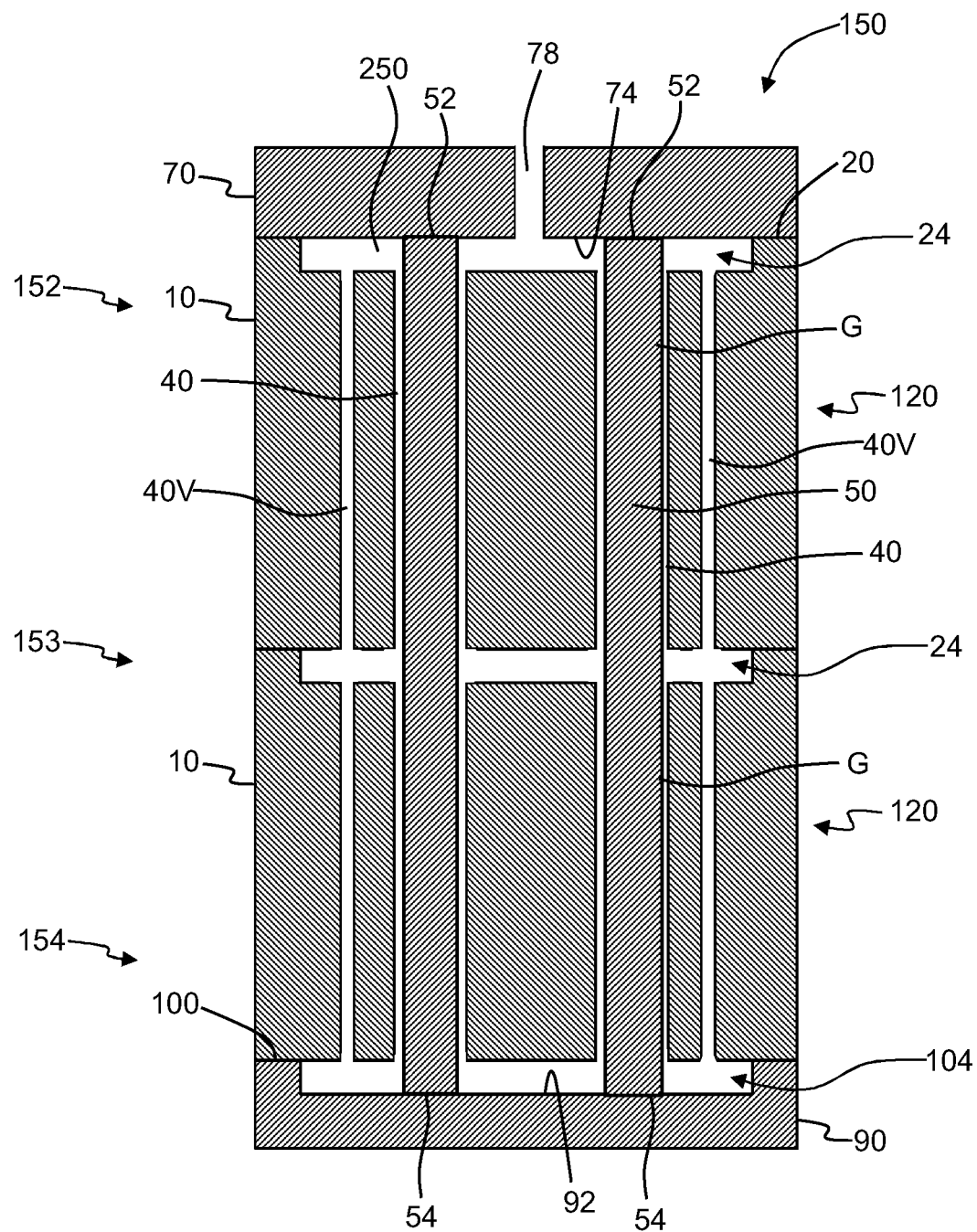
FIG. 5H is similar to FIG. 5E and illustrates an example wherein the glass cladding section include axial vacuum holes that are only used to support the vacuum and do not support canes.

FIG. 5H is similar to FIG. 5E and illustrates an example wherein the glass cladding sections 10 include vacuum holes 40V. In practice, one or more of the vacuum holes 40V constitute a portion of the internal chamber 250 and can be used to help pull vacuum and thus support a desired pressure differential $\Delta P$. At least one vacuum hole 40V can be used when the gap size $\delta G$ is sufficiently small and/or the number of axial holes 40 that respectively support a cane 50 is small (e.g., one or two) such that additional volume for the internal chamber 250 is desired to pull a stronger vacuum. The vacuum holes 40V need not be precision formed since they remain empty and collapse with the rest of the regions of the internal chamber 250 during consolidation, as described below. In an example, the vacuum holes 40V are cylindrical and run axially through the glass body 11 of the glass cladding section 10. The vacuum holes 40V can have any reasonable diameter, shape, size, etc., such that when they collapse during the consolation process, the glass body 11 of the glass cladding section 10 is not substantially distorted.

Forming the Glass Preform from the Preform Assembly

Figure 6A:
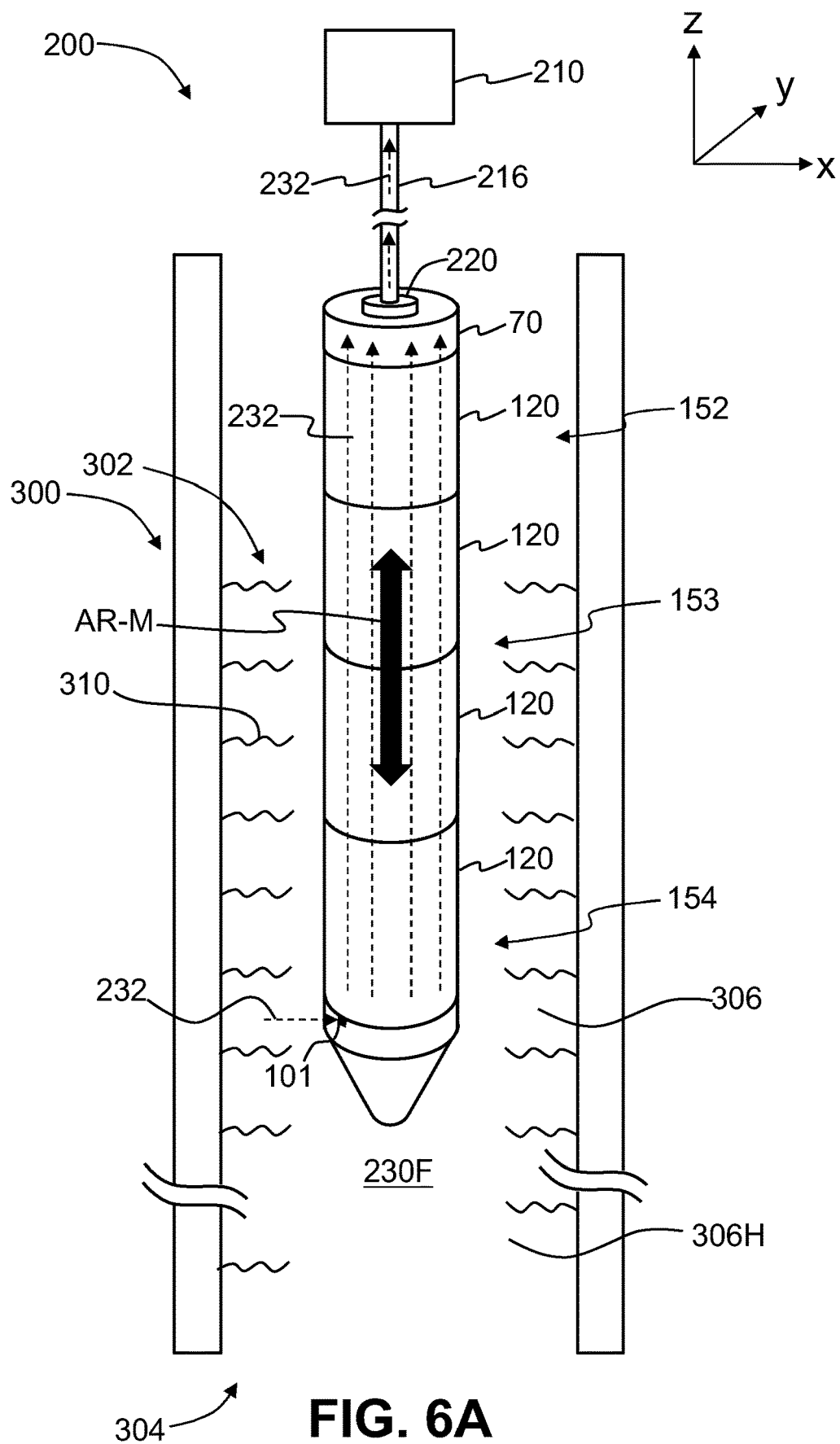
FIG. 6A is similar to FIG. 5A and shows the bottom end portion of the preform assembly residing within the interior of a furnace to initiate the consolidation process.

FIG. 6A is similar to FIG. 5A and shows the preform system 200 operably disposed relative to a furnace 300 having a top open end 302, a bottom open end 304 and an interior 306 in which heat 310 is generated and substantially contained. The furnace interior 306 comprises a furnace ambient atmosphere 230F of gas 232, which can comprise one or more select gasses as needed.

The preform system 200 is shown in an initial configuration with the bottom-end portion 154 of the preform assembly 150 residing within the furnace interior 306 to initiate the consolidation process to form a glass preform. The bottom-end portion 154 is heated to a temperature that bonds together the various glass components of the preform assembly 150.

Generally, when the preform assembly 150 enters the hottest portion of the furnace interior 306, the interfaced lip 100 of the bottom cap 90 and the lips 20 of adjacent glass cladding sections 10 seal to their respective bottom ends 15 of the glass cladding sections. Then the other adjacent surfaces within the preform assembly gradually seal from the outside in. The recesses 24 between adjacent cane-cladding assemblies 120 and the recess 104 associated with bottom cap 90 close as the heat 310 diffuses radially inward through the thickness of the components of the preform assembly 150. As the down drive of the preform assembly progresses, the canes 50 seal within their respective axial holes 40, and then the top recess 24 seals against the top cap 70.

In an example, the entire preform assembly 150 is heated to a temperature of about 1100° C. while the gas 232 of furnace ambient environment 230F includes chlorine gas, which is pulled through the internal chamber 250 by the applied vacuum of the vacuum system 210. This serves to dry and purify the preform assembly 150. For this step, the entire preform assembly is inserted into the furnace interior 306 and the temperature is controlled to the aforementioned drying and cleaning temperature of about 1100° C.

Next, the temperature is increased to be just above the glass softening temperature, which for silica glass is in the range from about 1400° C. to about 1500° C. Alternatively, the preform assembly 150 is lowered farther down into a hotter zone 306H of the furnace interior 306 where the temperature is in the range from about 1400° C. to about 1500° C. or higher. This is done to seal the various glass surfaces as discussed above. In this step, the gas 232 can include helium or other inert gas or just vacuum. The above temperature range is given as an example and those skilled in art will appreciate that polished silica surfaces may be chemically bonded at temperatures as low as 600° C. The bond that forms at about 1500° C. may be advantageous in many cases since it is substantially or fully cured, has substantially no residual stress, and has the same strength as solid glass. Another advantage of consolidation at or just above the glass softening temperature is that it allows for the polished surfaces of the preform assembly 150 to deform and come into contact regardless of poor flatness, polish quality, relatively large gap sizes and/or surface contamination.

Figure 6B:
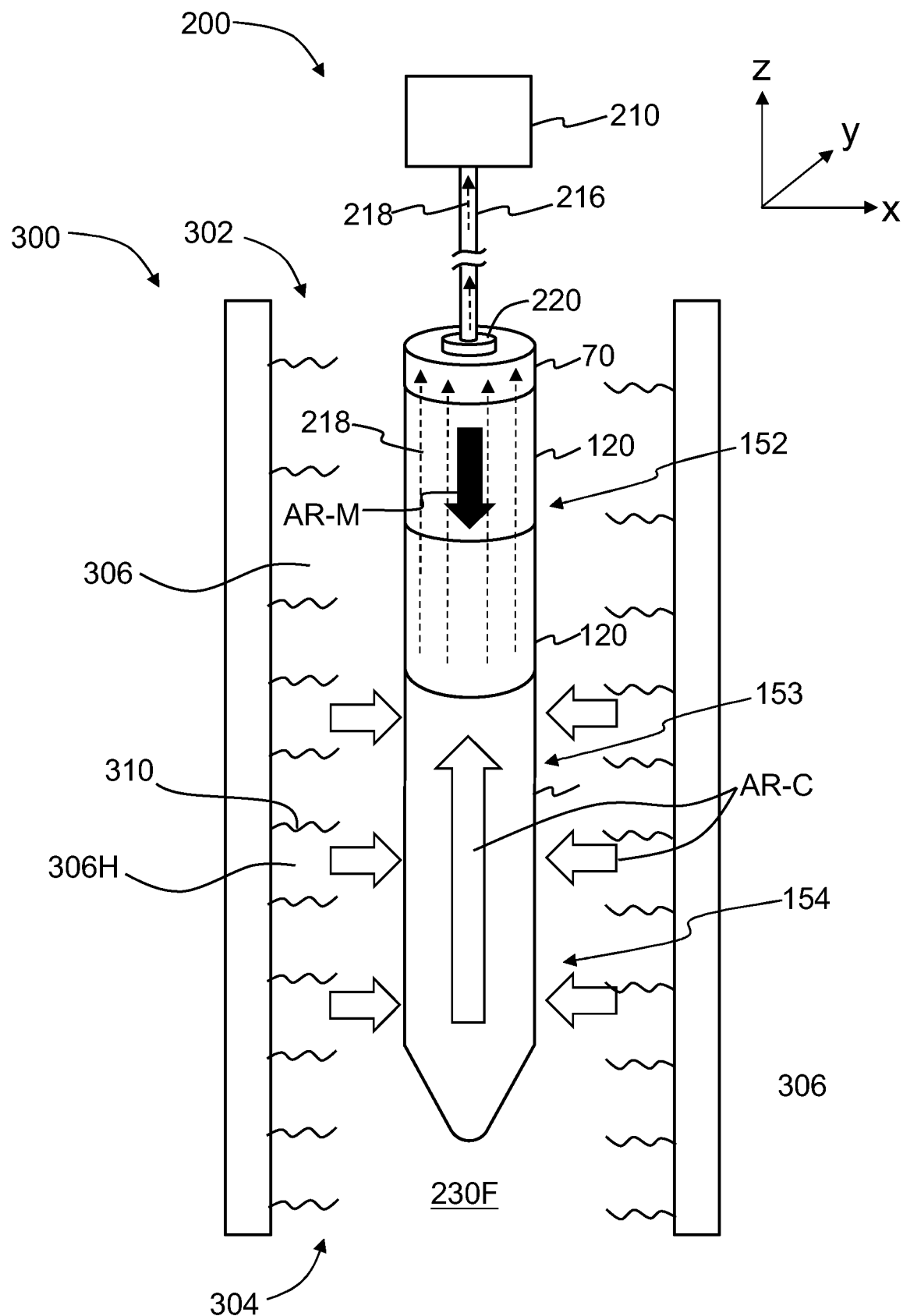
FIG. 6B illustrates a partially consolidated glass preform as the consolidation process moves from the bottom towards the top and from the outside of the preform assembly inwards (as indicated by the white arrows) as the preform assembly is heated by the furnace, and as the preform assembly is moved continuously downward into the furnace interior (as illustrated by the black arrow).

FIG. 6B is similar to FIG. 6A and shows the preform assembly 150 inserted farther into the furnace interior 306 into the hotter zone 306H. The white arrows AR-C schematically illustrate how the consolidation process progresses with time. In particular, the consolidation process moves upward from the bottom-end portion 154 to the central portion 153 and then on to the top-end portion 152 and from the outside of the preform assembly inward as the preform assembly 150 is moved downward within the furnace interior 306. Additionally, the glass flow at a temperature just above the glass softening temperature eliminates the internal chamber 250, which as noted above comprises relatively small gaps and recesses used to provide a vacuum path for creating the pressure differential ΔP that keeps the preform assembly 150 together prior to consolidation.

Figure 6C:
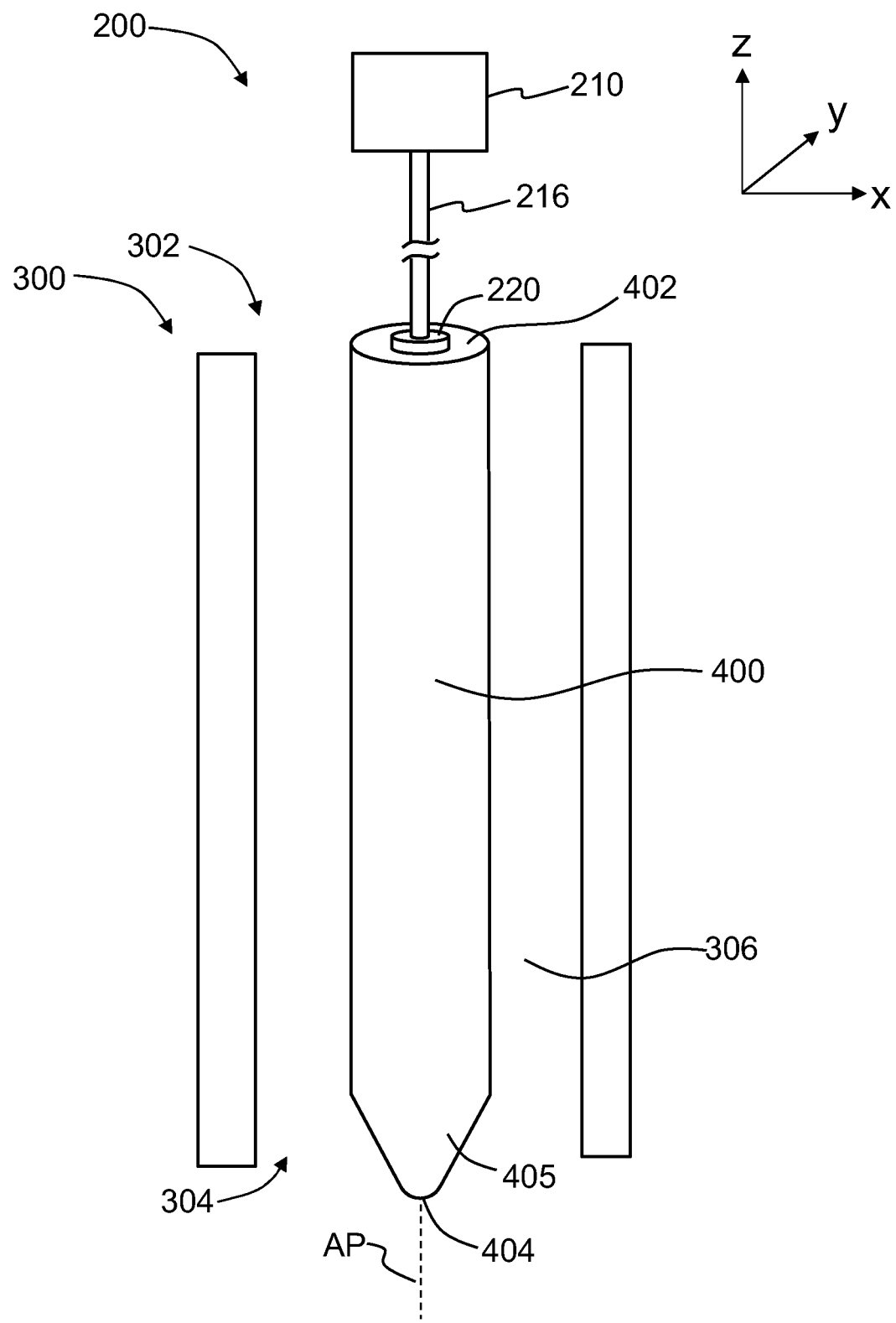
FIG. 6C is similar to FIG. 6B and shows the final glass preform residing in the furnace interior after the consolidation process has been completed.

FIG. 6C is similar to FIG. 6B and shows the resulting cane-based glass preform ("preform") 400 residing in the furnace interior 306 after the consolidation process has been completed. The glass preform 400 is referred to as being a "cane-based" preform because it is formed with and includes one or more canes 50. The glass preform 400 has a preform axis AP.

It should be noted that the consolidation of the (held-together) preform assembly 150 is performed in a single process step, namely the heating of the preform assembly near, to or just above the glass softening temperature. This single heating step seals all of the glass surfaces of the various components of the preform assembly 150.

At this point in the process, the glass preform 400 can be removed from the furnace 300. Alternatively, as described below, the glass preform 400 can immediately be used for fiber drawing when the furnace 300 comprises a draw furnace of a fiber drawing system. It is noted that loading the preform assembly 150 into the furnace 300 and unloading the resulting glass preform 400 is preferably done with care to avoid damage. In an example, the furnace temperature is reduced to 900° C. and the loading and unloading process can take up to one hour to prevent damage. This is one of many reasons why it may be preferable to perform the consolidation process in a draw furnace to form the glass preform 400 and then start the fiber draw process using the newly formed preform.

Fabricating the Optical Fiber

Figure 7:
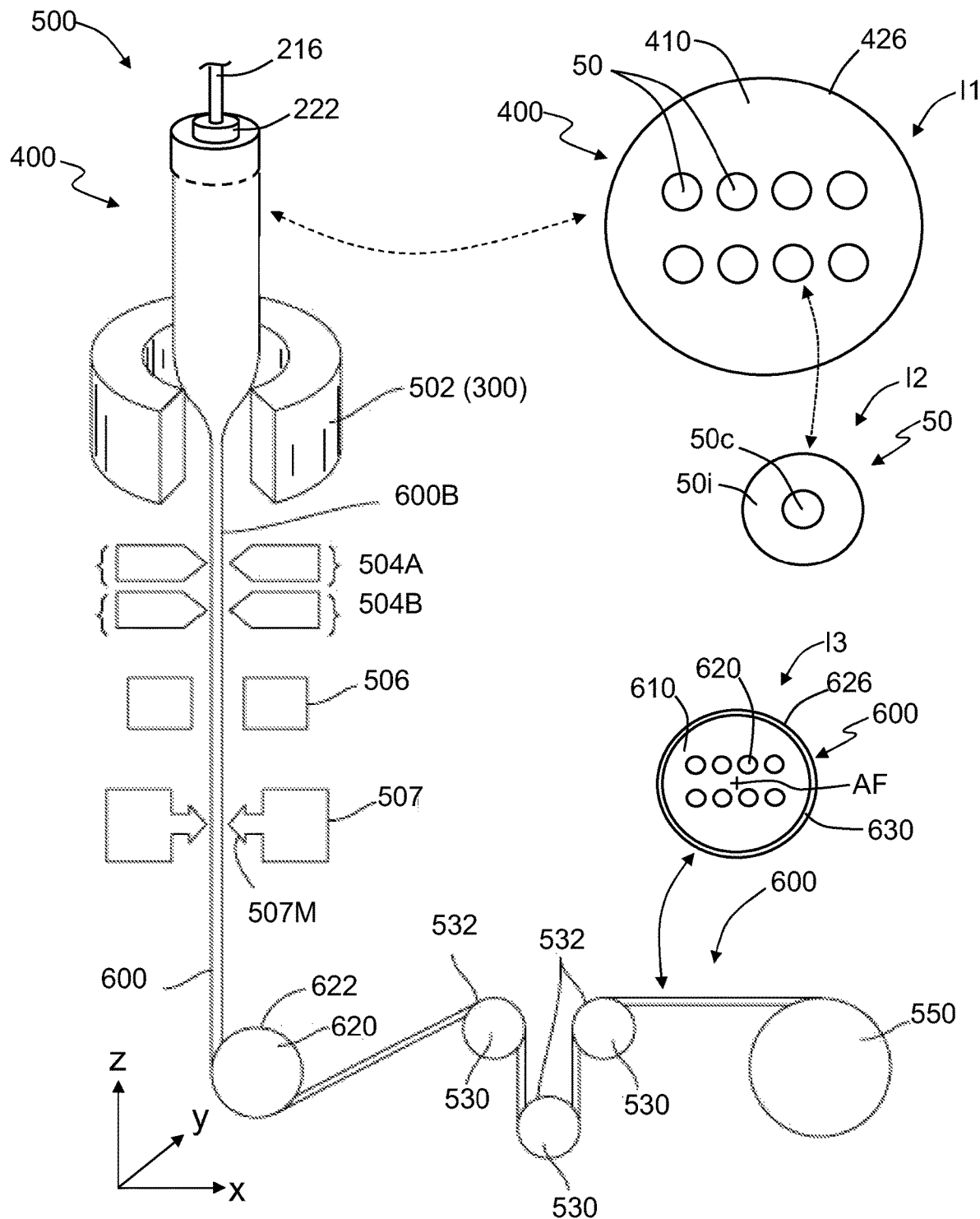
FIG. 7 is a schematic diagram of an example drawing system for drawing the glass preform of FIG. 6C into an optical fiber.

FIG. 7 is a schematic diagram of an example optical fiber drawing system ("drawing system") 500 for drawing the glass preform 400 as formed using the systems and methods described above into an optical fiber ("fiber") 600. The glass preform 400 can be used to form a single core optical fiber or a multicore optical fiber. In the example shown, the formation of a multicore optical fiber with eight cores is depicted by way of illustration.

The fiber 600 can be made using standard optical fiber fabrication drawing techniques using the drawing system 500. The example drawing system 500 includes a draw furnace 502 for heating the glass preform 400 to the glass melt temperature. In an example, the draw furnace 502 is the same as the furnace 300 used to consolidate the preform assembly 150 to form the glass preform 400 so that the glass preform 400 does not have to be transferred to another furnace to carry out the fiber draw process. In an example, the fiber draw process is carried out a glass melt temperature, which in an example is in the range from 1800° C. to 1900° C.

The drawing system 500 also includes non-contact measurement sensors 504A and 504B for measuring the size of a drawn (bare) fiber 600B that exits the draw furnace 502 for size (diameter) control. A cooling station 506 resides downstream of the measurement sensors 504A and 504B and is configured to cool the bare fiber 600B. A coating station 507 resides downstream of the cooling station 506 and is configured to deposit a protective coating material 507M onto the bare fiber 600B to form a coated fiber 600. A tensioner 620 resides downstream of the coating station 507. The tensioner 620 has a surface 622 that pulls (draws) the coated fiber 600. A set of guide wheels 530 with respective surfaces 532 resides downstream of the tensioner 620. The guide wheels 530 serve to guide the coated fiber 600, to a fiber take-up spool ("spool") 550 to store the coated fiber 600.

The close-up inset I1 of FIG. 7 shows a cross-sectional view of the glass preform 400. The glass preform 400 includes a preform outer cladding 410 as defined by the body 11 of the one or more glass cladding sections 10 used to form the glass preform 400. The glass preform 400 includes the canes 50 embedded therein and running axially, i.e., parallel to the preform axis AP. As shown in the close-up inset I2, the canes 50 include the aforementioned core region 51c and inner cladding region 50i. Other configurations for the canes 50 can also be employed. The preform outer cladding 410 serves as an outer cladding that resides immediately adjacent either the inner cladding region 51i or the core region 51c of the cane if there is no inner cladding region included in the cane.

The close-up inset I3 shows a cross-sectional view of the coated fiber 600, which in the example is a multicore fiber. The coated fiber 600 comprises an outer cladding 610 with cores 620 embedded therein and running axially, i.e., parallel to a fiber central axis AF. As shown in the close-up inset I4, the cores 620 are defined by the canes 50 of the glass preform 400 and so can include corresponding core regions 620c and inner cladding 620i. Other configurations for the cores 620 can also be employed. The coated fiber 600 has an outer surface 626 on which is formed the protective coating 630 made of the coating material 507M. In an example, the coating material 507 is a non-glass material, such as a polymer or acrylate.

Aspect 1 of the description is:
A method of forming a cane-based preform, comprising:
applying a vacuum to a preform assembly, the preform assembly comprising at least one glass cladding section having one or more axial holes and a top end and a bottom end, with one or more canes respectively residing in the one or more axial holes; capping the top and bottom ends to define a substantially sealed internal chamber; and
heating the vacuum-held preform assembly to just above the glass softening point to consolidate the vacuum-held preform to form the cane-based glass preform Aspect 2 of the description is:
The method according to Aspect 1, wherein prior to said applying a vacuum, forming the preform assembly by:
drilling the at least one glass cladding section to form the one or more axial holes;
operably disposing the one or more canes in the respective one or more axial holes; and
wherein said capping comprises adding top and bottom glass caps to the top and bottom ends, respectively, of the at least one glass cladding section to define the substantially sealed internal chamber.

Aspect 3 of the description is:
The method according to Aspect 1 or 2, wherein the at least one glass cladding comprises two more glass cladding sections that are stacked with their axial holes aligned and that have an axial length, an uppermost glass cladding section that defines the top end and a lowermost glass cladding section that defines the bottom end, and wherein the one or more canes each have a cane length that is at least substantially equal to or greater than the axial length.

Aspect 4 of the description is:
The method according to any of Aspects 1-3, wherein each of the one or more canes comprises a glass core region surrounded by a glass inner cladding region.

Aspect 5 of the description is:
The method according to Aspect 4, wherein at least one of the glass core region and the glass inner cladding region comprises doped silica glass.

Aspect 6 of the description is:
The method according to Aspect 4 or 5, wherein the glass inner cladding region comprises one or more undoped or down-doped inner claddings sections.

Aspect 7 of the description is:
The method according to any of Aspects 1-6, wherein the top end of each glass cladding section includes a recess defined by a raised outer lip.

Aspect 8 of the description is:
The method according to any of Aspects 2-7, wherein the glass bottom cap has an outer surface and a perimeter lip that defines a recess that constitutes a portion of the substantially sealed internal chamber.

Aspect 9 of the description is:
The method according to Aspect 8, wherein the glass bottom cap includes a passage from the recess to the outer surface, wherein the passage allows gas from the ambient environment to flow through the internal chamber.

Aspect 10 of the description is:
The method according to Aspect 9, wherein the gas from the ambient environment comprises chlorine.

Aspect 11 of the description is:
The method according to any of Aspects 8-10, wherein the act of applying a vacuum is performed through an axial hole in the glass top cap.

Aspect 12 of the description is:
The method according to Aspect 11, wherein the vacuum is provided from a vacuum system via an extendable vacuum conduit glass welded to the glass top cap.

Aspect 13 of the description is:
The method according to any of Aspects 1-12, wherein the one or more axial holes consists of a single axial hole and the one or more canes consists of a single can that resides in the single axial hole.

Aspect 14 of the description is:
The method according to any of Aspects 1-13, wherein the heating of the held-together preform assembly is performed using a furnace.

Aspect 15 of the description is:
The method according to Aspect 14, wherein the furnace comprises an optical fiber draw furnace.

Aspect 16 of the description is:
The method according to Aspect 15, further comprising:
without removing the cane-based preform from the draw furnace, using the draw furnace to draw an optical fiber from the cane-based glass preform.

Aspect 17 of the description is:
The method according to any of Aspects 1-16, wherein the substantially sealed internal chamber comprises at least one vacuum hole that defines a portion of the substantially sealed chamber.

Aspect 18 of the description is:
The method according to any of Aspects 1-17, wherein each cane has a cane diameter DC, each axial hole has a hole diameter DH>DC, and wherein the substantially sealed internal chamber comprises for each axial hole a gap formed by the difference between the hole diameter and the cane diameter.

Aspect 19 of the description is:
The method according to Aspect 18, wherein the gap has a gap size $\delta G=(DH-DC)/2$ and wherein gap size $0<\delta G \leq 0.1$ mm.

Aspect 20 of the description is:
The method according to any of Aspects 1-19, further comprising:
drawing an optical fiber using the cane-based glass preform.

Aspect 21 of the description is:
A method of forming a cane-based glass preform, comprising:
  forming one or more axial holes in each of multiple glass cladding sections each having a body, a top end, a bottom end and a perimeter, with each top end having a lip that runs around the perimeter and that defines a top recess, and wherein each axial hole is defined by a cylindrical inner surface of the body;
  stacking the multiple glass cladding sections so that the axial holes formed in each glass cladding section are axially aligned, with the stacked multiple glass cladding sections having an overall stack length LS, an uppermost glass cladding section and a lowermost glass cladding section;
  inserting one or more glass canes into the respective one or more aligned axial holes of the multiple glass cladding sections such that there is a gap between each glass cane and the cylindrical inner surface of the axial hole in which it resides;
  interfacing a glass top cap with the top end of the uppermost glass cladding section and interfacing a glass bottom cap with the bottom end of the lowermost glass cladding section to define a preform assembly having a substantially sealed internal chamber that includes the top recess and the gaps;
  applying a vacuum through the glass top cap to the substantially sealed internal chamber to create with respect to an ambient environment a pressure differential that holds together the preform assembly to define a vacuum-held preform assembly; and
  heating the vacuum-held preform assembly to just above the glass softening point to consolidate the vacuum-held preform assembly to form the glass preform.

Aspect 22 of the description is:
The method according to Aspect 21, wherein each cane has a cane length LC that is at least as long as the stack length LS.

Aspect 23 of the description is:
The method according to Aspect 21 or 22, wherein each cane comprises a glass core region surrounded by a glass inner cladding region.

Aspect 24 of the description is:
The method according to Aspect 23, wherein at least one of the glass core region and the glass inner cladding region comprises doped silica glass.

Aspect 25 of the description is:
The method according to Aspect 23 or 24, wherein the glass inner cladding region comprises one or more undoped or down-doped inner claddings sections.

Aspect 26 of the description is:
The method according to any of Aspects 21-25, wherein the glass bottom cap has an outer surface and a perimeter lip that defines a recess that constitutes a portion of the substantially sealed internal chamber.

Aspect 27 of the description is:
The method according to Aspect 26, wherein the glass bottom cap includes a passage from the recess to the outer surface, wherein the passage allows gas from the ambient environment to flow through the internal chamber while substantially maintaining the pressure differential.

Aspect 28 of the description is:
The method according to Aspect 27, wherein the gas from the ambient environment comprises chlorine.

Aspect 29 of the description is:
The method according to any of Aspects 21-28, wherein the act of applying a vacuum is performed through an axial hole in the top cap.

Aspect 30 of the description is:
The method according to Aspect 29, wherein the vacuum is provided from a vacuum system via an extendable vacuum conduit glass welded to the top cap and in pneumatic communication with the axial hole in the top cap.

Aspect 31 of the description is:
The method according to any of Aspects 21-30, wherein the one or more axial holes consists of a single axial hole and the one or more canes consists of a single can that resides in the single axial hole.

Aspect 32 of the description is:
The method according to any of Aspects 21-31, wherein the heating of the vacuum-held preform assembly is performed using a furnace.

Aspect 33 of the description is:
The method according to Aspect 32, wherein the furnace comprises an optical fiber draw furnace.

Aspect 34 of the description is:
The method according to Aspect 33, further comprising:
  without removing the cane-based preform from the draw furnace, using the draw furnace to draw an optical fiber from the cane-based glass preform.

Aspect 35 of the description is:
The method according to any of Aspects 21-34, wherein the substantially sealed internal chamber comprises at least one vacuum hole that defines a portion of the substantially sealed chamber.

Aspect 36 of the description is:
The method according to any of Aspects 21-35, wherein each cane has a cane diameter DC, each axial hole has a hole diameter DH>DC, and wherein internal chamber comprises for each axial hole a gap formed by the difference between the hole diameter and the cane diameter.

Aspect 37 of the description is:
The method according to Aspect 36, wherein the gap has a gap size $\delta G=(DH-DC)/2$ and wherein gap size $\delta G$ is in the range $0<\delta G \leq 0.1$ mm.

Aspect 38 of the description is:
The method according to any of Aspects 21-37, further comprising:
  drawing an optical fiber using the cane-based glass preform.

Aspect 39 of the description is:
A method of forming a cane-based glass preform assembly, comprising:
  forming one or more axial holes in at least one glass cladding section, the at least one cladding section having a top end and a bottom end;
  adding one or more canes to the respective one or more axial holes so that each axial hole includes a cane;
  capping the top and bottom ends to form a preform assembly having a substantially sealed internal chamber that pneumatically connects the top and bottom ends through the axial holes; and
  applying a vacuum to the substantially sealed internal chamber to create a pressure differential between the substantially sealed internal chamber and an ambient environment to form a vacuum-held preform assembly.

Aspect 40 of the description is:
The method according to Aspect 39, further comprising:
  heating the vacuum-held preform assembly to just above the glass softening point to consolidate the vacuum-held preform to form a cane-based glass preform.

Aspect 41 of the description is:
A method of forming a cane-based glass preform assembly for forming a multicore optical fiber, comprising:

stacking multiple glass cladding sections each having multiple axial holes so that the axial holes are aligned, with adjacent glass cladding sections being interfaced with a raised lip that forms an internal cavity, and wherein there is an uppermost and a lowermost glass cladding section;

adding a cane to each of the aligned axial holes to define gaps within the axial holes that provide pneumatic communication between the internal cavities;

capping the uppermost and lowermost glass cladding sections to define a preform assembly having a substantially sealed internal chamber that comprises the internal cavities and the gaps; and applying a vacuum to the substantially sealed internal chamber to form a vacuum-held preform assembly.

Aspect 42 of the description is:
The method according to Aspect 41, further comprising: consolidating the vacuum-held preform assembly to form a cane-based glass preform by applying heat to the vacuum-held preform assembly to just above the glass softening point.

Aspect 43 of the description is:
The method according to Aspect 42, further comprising drawing an optical fiber using the cane-based glass preform.

Aspect 44 of the description is:
The method according to Aspect 43, wherein said consolidating is performed a furnace, and wherein said drawing is performed using said furnace.

Aspect 45 of the description is:
A cane-based preform product formed by a process comprising:
applying a vacuum to a preform assembly, the preform assembly comprising at least one glass cladding section having one or more axial holes and a top end and a bottom end, with one or more canes respectively residing in the one or more axial holes and a top cap at the top end and a bottom cap at the bottom end; and heating the vacuum-held preform assembly to just above the glass softening point to consolidate the vacuum-held preform to form the cane-based glass preform.

Aspect 46 of the description is:
A cane-based glass preform product formed by a process comprising:
forming one or more axial holes in each of multiple glass cladding sections each having a body, a top end, a bottom end and a perimeter, with each top end having a lip that runs around the perimeter and that defines a top recess, and wherein each axial hole is defined by a cylindrical inner surface of the body;

stacking the multiple glass cladding sections so that the axial holes formed in each glass cladding section are axially aligned, with the stacked multiple glass cladding sections having an overall stack length LS, an uppermost glass cladding section and a lowermost glass cladding section;

inserting one or more glass canes into the respective one or more aligned axial holes of the multiple glass cladding sections such that there is a gap between each glass cane and the cylindrical inner surface of the axial hole in which it resides;

interfacing a glass top cap with the top end of the uppermost glass cladding section and interfacing a glass bottom cap with the bottom end of the lowermost glass cladding section to define a preform assembly having a substantially sealed internal chamber that includes the top recess and the gaps;

applying a vacuum through the glass top cap to the substantially sealed internal chamber to create with respect to an ambient environment a pressure differential that holds together the preform assembly to define a vacuum-held preform assembly; and heating the vacuum-held preform assembly to just above the glass softening point to consolidate the vacuum-held preform assembly to form the glass preform.

Aspect 47 of the description is:
A cane-based glass preform assembly product formed by a process comprising:
forming one or more axial holes in at least one glass cladding section, the at least one cladding section having a top end and a bottom end;

adding one or more canes to the respective one or more axial holes so that each axial hole includes a cane;

capping the top and bottom ends to form a preform assembly having a substantially sealed internal chamber that pneumatically connects the top and bottom ends through the axial holes; and applying a vacuum to the substantially sealed internal chamber to create a pressure differential between the substantially sealed internal chamber and an ambient environment to form a vacuum-held preform assembly.

Aspect 48 of the description is:
A cane-based glass preform product formed by the process comprising:
the process according to Aspect 47; and
heating the vacuum-held preform assembly to just above the glass softening point to consolidate the vacuum-held preform to form a cane-based glass preform.

Aspect 49 of the description is:
A cane-based glass preform assembly product for forming a multicore optical fiber formed by a process comprising:
stacking multiple glass cladding sections each having multiple axial holes so that the axial holes are aligned, with adjacent glass cladding sections being interfaced with a raised lip that forms an internal cavity, and wherein there is an uppermost and a lowermost glass cladding section;

adding a cane to each of the aligned axial holes to define gaps within the axial holes that provide pneumatic communication between the internal cavities;

capping the uppermost and lowermost glass cladding sections to define a preform assembly having a substantially sealed internal chamber that comprises the internal cavities and the gaps; and applying a vacuum to the substantially sealed internal chamber to form a vacuum-held preform assembly.

Aspect 50 of the description is:
A cane-based glass preform product formed by a process comprising:
the process according to Aspect 49; and
consolidating the vacuum-held preform assembly to form a cane-based glass preform by applying heat to the vacuum-held preform assembly to just above the glass softening point.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:
1. A method of forming a cane-based preform, comprising:
forming a vacuum-held preform assembly by applying a vacuum to a preform assembly, the vacuum creating a pressure differential sufficient to hold together the preform assembly, the preform assembly comprising at least one glass cladding section having one or more axial holes and a top end and a bottom end, with one or more canes respectively residing in the one or more axial holes;
capping the top and bottom ends to define a substantially sealed internal chamber; and
heating the vacuum-held preform assembly to or just above the glass softening point to consolidate the vacuum-held preform assembly to form the cane-based glass preform.

2. The method according to claim 1, wherein prior to said applying a vacuum, forming the preform assembly by:
drilling the at least one glass cladding section to form the one or more axial holes;
operably disposing the one or more canes in the respective one or more axial holes; and
wherein the capping comprises adding top and bottom glass caps to the top and bottom ends, respectively, of the at least one glass cladding section to define the substantially sealed internal chamber.

3. The method according to claim 1, wherein the at least one glass cladding section comprises two or more glass cladding sections that are stacked with their axial holes aligned and that have an overall stack length LS, an uppermost glass cladding section that defines the top end and a lowermost glass cladding section that defines the bottom end, and wherein the one or more canes each have a cane length LC that is at least substantially equal to or greater than the overall stack length LS.

4. The method according to claim 1, wherein each of the one or more canes comprises a glass core region surrounded by a glass inner cladding region.

5. The method according to claim 1, wherein the top end of the glass cladding section includes a recess defined by a raised outer lip.

6. The method according to claim 2, wherein the glass bottom cap has an outer surface and a perimeter lip that defines a recess that constitutes a portion of the substantially sealed internal chamber.

7. The method according to claim 6, wherein the glass bottom cap includes a passage from the recess to the outer surface, wherein the passage allows gas from the ambient environment to flow through the internal chamber.

8. The method according to claim 7, wherein the gas from the ambient environment comprises chlorine.

9. The method according to claim 1, wherein the one or more axial holes consists of a single axial hole and the one or more canes consists of a single cane that resides in the single axial hole.

10. The method according to claim 1, wherein the substantially sealed internal chamber comprises at least one vacuum hole that defines a portion of the substantially sealed internal chamber.

11. The method according to claim 1, wherein each cane has a cane diameter DC, each axial hole has a hole diameter DH>DC, and wherein the substantially sealed internal chamber comprises for each axial hole a gap formed by the difference between each cane and a cylindrical inner surface of the axial hole in which it resides.

12. The method according to claim 11, wherein each gap has a gap size $\delta G=(DH-DC)/2$ in the range $0<\delta G\leq 0.1$ mm.

13. A method of forming a cane-based glass preform, comprising:
forming one or more axial holes in each of multiple glass cladding sections each having a body, a top end, a bottom end and a perimeter, with each top end having a lip that runs around the perimeter and that defines a top recess, and wherein each axial hole is defined by a cylindrical inner surface of the body;
stacking the multiple glass cladding sections so that the axial holes formed in each glass cladding section are axially aligned, with the stacked multiple glass cladding sections having an overall stack length LS, an uppermost glass cladding section and a lowermost glass cladding section;
inserting one or more canes into the respective one or more aligned axial holes of the stacked multiple glass cladding sections such that there is a gap between each glass cane and a cylindrical inner surface of the aligned axial hole in which it resides;
interfacing a glass top cap with the top end of the uppermost of the stacked multiple glass cladding sections and interfacing a glass bottom cap with the bottom end of the lowermost of the stacked multiple glass cladding sections to define a preform assembly having a substantially sealed internal chamber that includes each of the top recesses and each of the gaps;
forming a vacuum-held preform assembly by applying a vacuum through the glass top cap to the substantially sealed internal chamber to create with respect to an ambient environment a pressure differential that holds together the preform assembly; and
heating the vacuum-held preform assembly to or just above the glass softening point to consolidate the vacuum-held preform assembly to form the cane-based glass preform.

14. The method according to claim 13, wherein each cane has a cane length LC that is at least as long as the overall stack length LS.

15. The method according to claim 13, wherein each cane comprises a glass core region surrounded by a glass inner cladding region.

16. The method according to claim 13, wherein the act of applying a vacuum is performed through an axial hole in the glass top cap.

17. The method according to claim 13, wherein the one or more axial holes in each of the multiple glass cladding sections consists of a single axial hole, the one or more aligned axial holes consists of a single aligned axial hole, and the one or more canes consists of a single cane that resides in the single aligned axial hole.

18. The method according to claim 13, wherein the substantially sealed internal chamber comprises at least one vacuum hole that defines a portion of the substantially sealed internal chamber.

19. The method according to claim 13, wherein each cane has a cane diameter DC, each aligned axial hole has a hole diameter DH>DC, and wherein each of the gaps has a gap size $\delta G=(DH-DC)/2$.

20. The method according to claim 19, wherein the gap size $\delta G$ of each of the gaps is in the range $0<\delta G\leq 0.1$ mm.

* * * * *